(12) United States Patent
Saito et al.

(10) Patent No.: US 9,014,898 B2
(45) Date of Patent: Apr. 21, 2015

(54) ELECTRICALLY DRIVEN DUMP TRUCK

(75) Inventors: Shinjiro Saito, Kasumigaura (JP); Kichio Nakajima, Isesaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/004,605

(22) PCT Filed: Apr. 5, 2012

(86) PCT No.: PCT/JP2012/059408
§ 371 (c)(1),
(2), (4) Date: Sep. 11, 2013

(87) PCT Pub. No.: WO2012/157364
PCT Pub. Date: Nov. 22, 2012

(65) Prior Publication Data
US 2014/0005871 A1    Jan. 2, 2014

(30) Foreign Application Priority Data

May 17, 2011    (JP) ................................ 2011-110767

(51) Int. Cl.
*B60L 5/04* (2006.01)
*B60L 5/08* (2006.01)
(Continued)

(52) U.S. Cl.
CPC . *B60L 5/045* (2013.01); *B60L 5/08* (2013.01); *B60L 9/28* (2013.01); *B60L 11/08* (2013.01); *B60L 15/2036* (2013.01); *B60L 2200/36* (2013.01); *B60L 2210/30* (2013.01); *B60L 2210/40* (2013.01); *B60L 2220/46* (2013.01);
(Continued)

(58) Field of Classification Search
USPC ..................... 701/22, 50, 69, 70, 72, 91, 124; 180/2.1; 191/33 R, 35, 50, 60.2
See application file for complete search history.

(56) References Cited

U.S. PATENT DOCUMENTS

| | | | |
|---|---|---|---|
| 4,483,148 | A | 11/1984 | Minami |
| 4,745,997 | A | 5/1988 | Takei et al. |

(Continued)

FOREIGN PATENT DOCUMENTS

| | | | |
|---|---|---|---|
| JP | 53-006065 | | 1/1978 |
| JP | 63-035102 | A | 2/1988 |

(Continued)

OTHER PUBLICATIONS

International Search Report issued in corresponding application No. PCT/JP/2012/059408 on Jul. 17, 2012.

*Primary Examiner* — Marthe Marc-Coleman
(74) *Attorney, Agent, or Firm* — Brundidge & Stanger, P.C.

(57) ABSTRACT

A vehicle control device 50, a controller 100, an inverter control device 30 and a steering control device 32 constitute a control device 200 which controls elevation of sliders 4Ra and 4La of power collectors 4R and 4L based on information detected by a trolley wire detecting device (camera) 15. The control device 200 calculates positional relationship between a slider and a trolley wire 3R/3L based on the information detected by the trolley wire detecting device. When the slider has deviated from a prescribed range for being in contact with the trolley wire, the control device executes control to prohibit an operation for elevating the sliders or to lower the sliders when the sliders have been elevated. With this configuration, an electrically driven dump truck capable of lightening the operating load on the driver during the trolley traveling is provided.

12 Claims, 30 Drawing Sheets

(51) Int. Cl.
*B60L 9/28* (2006.01)
*B60L 11/08* (2006.01)
*B60L 15/20* (2006.01)

(52) U.S. Cl.
CPC .......... *B60L 2240/12* (2013.01); *B60L 2240/22* (2013.01); *B60L 2240/421* (2013.01); *B60L 2240/423* (2013.01); *B60L 2240/441* (2013.01); *B60L 2240/443* (2013.01); *B60L 2240/62* (2013.01); *B60L 2250/10* (2013.01); *B60L 2250/16* (2013.01); *Y02T 10/7077* (2013.01); *Y02T 10/7241* (2013.01); *Y02T 90/16* (2013.01); *Y02T 90/162* (2013.01); *Y02T 10/642* (2013.01); *B60L 2200/26* (2013.01)

(56) References Cited

U.S. PATENT DOCUMENTS

2007/0062771 A1* 3/2007 Li ................................. 191/50
2011/0257876 A1* 10/2011 Yokota ......................... 701/124

FOREIGN PATENT DOCUMENTS

| JP | 11-096497 A | | 4/1999 | |
| JP | 2005-094952 A | | 4/2005 | |
| JP | 2005-094952 A | * | 4/2005 | ............. H01R 41/00 |
| JP | 2007-295640 A | * | 11/2007 | ................ B60L 3/00 |
| JP | 2007-295640 A | | 11/2007 | |
| JP | 2009-040215 A | * | 2/2009 | ............... B60M 1/28 |

* cited by examiner

ELECTRICALLY DRIVEN DUMP TRUCK

TECHNICAL FIELD

The present invention relates to an electrically driven dump truck. In particular, to an electrically driven dump truck which travels by using electric power from trolley wires.

BACKGROUND ART

Some types of dump trucks that travel in mines are known as the series hybrid type. Such series hybrid type dump trucks generate electric power with a generator driven by the engine and supply the electric power to rear wheel motors for driving the rear wheels. By taking advantage of the electrical configuration of the series hybrid type, traveling technology based on the trolley system has been implemented. In the trolley-based traveling technology, trolley wires generally employed for electric trains are installed in prescribed climbing sections. In the climbing sections with trolley wires, a vehicle having power collectors (provided on the vehicle to be movable up and down) travels not by using the electric power supplied by the engine and the generator but by using electric power acquired from the trolley wires by elevating sliders of the power collectors to be in contact with the trolley wires (hereinafter referred to as "trolley traveling"). An example of the trolley-based traveling technology has been described in Patent Literature 1, for example. In this case, the drop in the traveling speed in the climbing sections (equipped with the trolley wires enabling the trolley traveling) can be avoided since the electric power supplied from the trolley wires is greater than the electric power generated with the engine power.

Meanwhile, there exists a conventional technology detecting the lane (for the traveling of the vehicle) and controlling the vehicle to prevent the vehicle from deviating from the lane based on the result of the detection, as described in Patent Literature 2. This technology is pertinent to the traveling technology of automobiles. Images of the road surface are shot with a camera or the like and lane markers (white lines, Botts dots, etc.) corresponding to the lane are extracted from the images by image processing. The control of the vehicle is executed by adjusting the steering and the driving/braking force so that the vehicle travels between the extracted lane markers. Imaginary offset lane markers are set a prescribed distance inside the lane markers (area to be judged as the lane) exclusively in prescribed sections, and a control value is increased as the vehicle deviates outward from the lane marker.

PRIOR ART LITERATURE

Patent Literature
Patent Literature 1: U.S. Pat. No. 4,483,148
Patent Literature 2: JP-11-96497-A

SUMMARY OF THE INVENTION

Problem to be Solved by the Invention

In the trolley-based traveling technology like the one described in the Patent Literature 1, the driver of the vehicle (dump truck) judges whether or not the vehicle has entered a trolley traveling section. When the vehicle has entered a trolley traveling section and the driver viewing the positional relationship between the sliders and the trolley wires judges that the sliders are capable of contacting the trolley wires, the driver operates a switch (e.g., trolley traveling starting button), by which the trolley traveling is started. During the trolley traveling, the driver visually checks the vehicle's displacement with respect to the trolley wires and performs the steering operation so that central positions of the sliders do not deviate widely from the trolley wires in the lateral direction. The timing for ending the trolley traveling is also judged by the driver; the trolley traveling is ended in response to the driver's pressing a button, for example.

During the trolley traveling, the sliders are kept in contact with the trolley wires by pressing the sliders against the trolley wires by use of biasing devices such as hydraulic piston devices. Thus, if the vehicle is widely displaced with respect to the trolley wires and a slider is disengaged from the trolley wire, the slider falls into an extremely unstable state. The power collector and a supporting member, etc. of the trolley wire are damaged. Therefore, the driver during the trolley traveling has to especially take care that the central positions of the sliders do not deviate widely from the trolley wires in the lateral direction.

However, such operations based on visual checks by the driver put a heavy load on the driver during the trolley traveling.

The traveling control technology described in the Patent Literature 2 is capable of controlling the vehicle (automobile) to prevent the vehicle from deviating from the lane. However, the lane markers on ordinary roads (like those described in the Patent Literature 2) do not exist on road surfaces in mines where dump trucks are traveling. Further, the condition of the road surface changes every hour and it is difficult to detect a suitable area on the road surface for the traveling by means of a sensor (e.g., radar) and image processing according to the conventional technology.

It is therefore the primary object of the present invention to provide an electrically driven dump truck capable of lightening the operating load on the driver during the trolley traveling.

Means for Solving the Problem

To achieve the above object, an invention described in claim 1 provides an electrically driven dump truck which elevates a slider of a power collector provided on a vehicle to be movable up and down, places the slider in contact with a trolley wire installed along a lane, and travels by using electric power from the trolley wire, comprising: a trolley wire detecting device which is provided on the vehicle and detects the trolley wire from below when the dump truck is traveling; and a control device which controls the elevation of the slider of the power collector based on information detected by the trolley wire detecting device.

In the electrically driven dump truck configured as above, the trolley wire is detected from below with the trolley wire detecting device, and thus there are less factors leading to detection errors compared to the conventional technique detecting lane markers, etc. by capturing images of the ground surface. As a result, the accuracy of the trolley wire detection is improved. By controlling the elevation of the slider of the power collector based on the information detected by the trolley wire detecting device, countermeasures (prohibiting the elevating operation of the slider, lowering the slider when the slider has been elevated, etc.) can be taken even when the central position of the slider of the traveling vehicle has deviated widely from the trolley wire in the lateral direction. Consequently, the operating load on the driver during the trolley traveling can be lightened considerably.

In an invention described in claim 2, in the electrically driven dump truck according to claim 1, the control device calculates positional relationship between the slider and the trolley wire based on the information detected by the trolley wire detecting device. When the slider has deviated from a prescribed range for being in contact with the trolley wire, the control device executes control to prohibit an operation for elevating the slider or to lower the slider when the slider has been elevated.

With this configuration, the operating load on the driver for elevating and lowering the slider during the trolley traveling can be lightened considerably.

In an invention described in claim 3, in the electrically driven dump truck according to claim 1, the control device calculates positional relationship between the slider and the trolley wire based on the information detected by the trolley wire detecting device. When the slider is within a prescribed range for being in contact with the trolley wire, the control device executes control to permit an operation for elevating the slider or to elevate the slider when the slider has been lowered.

With this configuration, the operating load on the driver for elevating and lowering the slider during the trolley traveling can be lightened considerably.

In an invention described in claim 4, in the electrically driven dump truck according to any one of claims 1-3, the control device calculates at least one representative point of the vehicle and at least one target point situated on the trolley wire based on the information detected by the trolley wire detecting device, calculates a deviation between the representative point and the target point, and issues a warning that the vehicle is apt to deviate from the lane when the absolute value of the deviation is greater than a threshold value.

With this configuration, it becomes possible to urge the driver to correct the steering.

In an invention described in claim 5, in the electrically driven dump truck according to any one of claims 1-4, the trolley wire detecting device includes: a camera which is provided on the vehicle and continuously captures images of the trolley wire when the dump truck is traveling; and an illuminating device which is provided on the vehicle and illuminates the trolley wire.

Even when a camera is employed for the trolley wire detecting device as above, illuminating the trolley wire with the illuminating device keeps high contrast between the sky and the trolley wire. Consequently, the slider elevation control can be executed with high accuracy not only in the daytime with fine weather but also in conditions in which such high contrast between the sky and the trolley wire is hardly achieved (evening, nighttime, rainy weather, etc.).

Effect of the Invention

According to the present invention, the trolley wire is detected from below with the trolley wire detecting device, and thus there are less factors leading to detection errors compared to the conventional technique detecting lane markers, etc. by capturing images of the ground surface. As a result, the accuracy of the trolley wire detection is improved. By controlling the elevation of the slider of the power collector based on the information detected by the trolley wire detecting device, countermeasures (prohibiting the elevating operation of the slider, lowering the slider when the slider has been elevated, etc.) can be taken even when the central position of the slider of the traveling vehicle has deviated widely from the trolley wire in the lateral direction. Consequently, the operating load on the driver during the trolley traveling can be lightened considerably.

MODE FOR CARRYING OUT THE INVENTION

Figure 1:
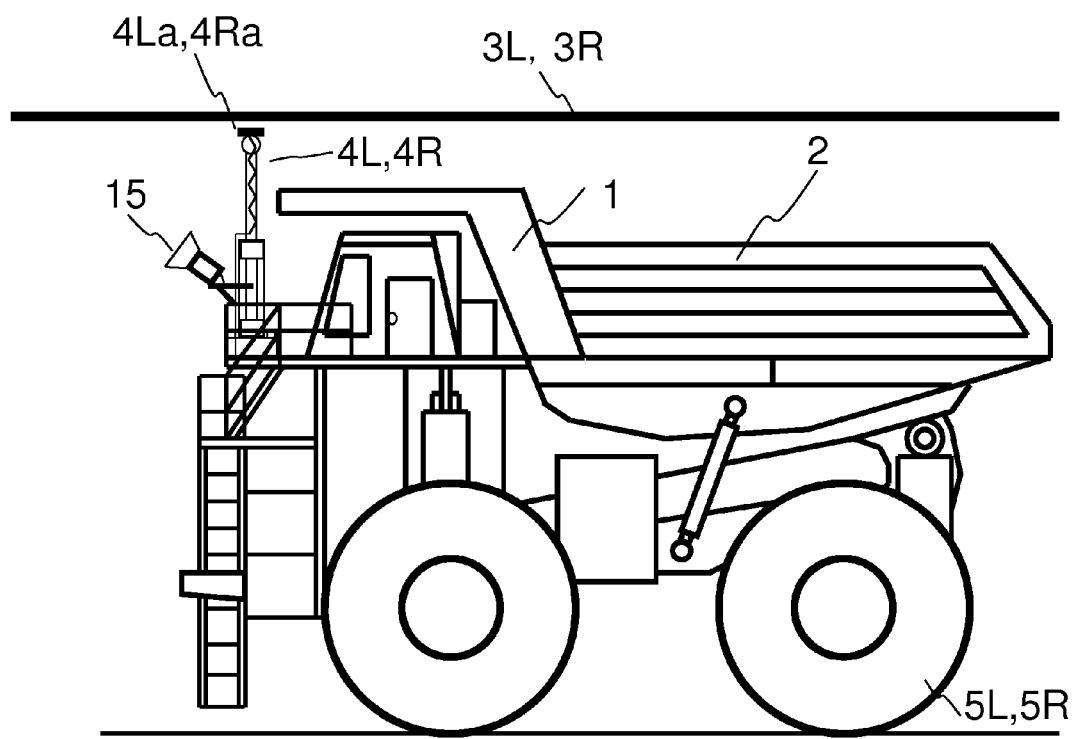
FIG. 1 is a side view showing the external appearance of an electrically driven dump truck in accordance with an embodiment of the present invention.

Referring now to the drawings, a description will be given in detail of a preferred embodiment in accordance with the present invention.

<Configuration of Vehicle—Dump Truck>

FIG. 1 is a side view showing the external appearance of an electrically driven dump truck in accordance with an embodiment of the present invention.

In FIG. 1, the dump truck comprises a vehicle 1, a vessel 2 for carrying earth, sand, etc., right and left power collectors 4R and 4L for collecting electric power, and right and left rear wheels (tires) 5R and 5L driven by the electric power collected by the power collectors 4R and 4L. The right and left power collectors 4R and 4L are equipped with sliders 4Ra and 4La which are movable up and down to receive the electric power from two (right and left) trolley wires 3R and 3L. One of the trolley wires 3R and 3L is at a high voltage and the other is grounded. The power collectors 4R and 4L are provided on a front part of the vehicle 1. The dump truck is equipped with a trolley wire detecting device 15 mounted on the front part of the vehicle 1. The trolley wire detecting device 15 continuously detects the trolley wires 3R and 3L in front of the dump truck when the dump truck is traveling. The trolley wire detecting device 15 is a device newly mounted on the dump truck according to the present invention. While the trolley wire detecting device 15 is mounted on the front part of the vehicle 1 in the illustrated example, the trolley wire detecting device 15 may also be arranged differently (e.g., on the roof of the vehicle 1).

Figure 2:
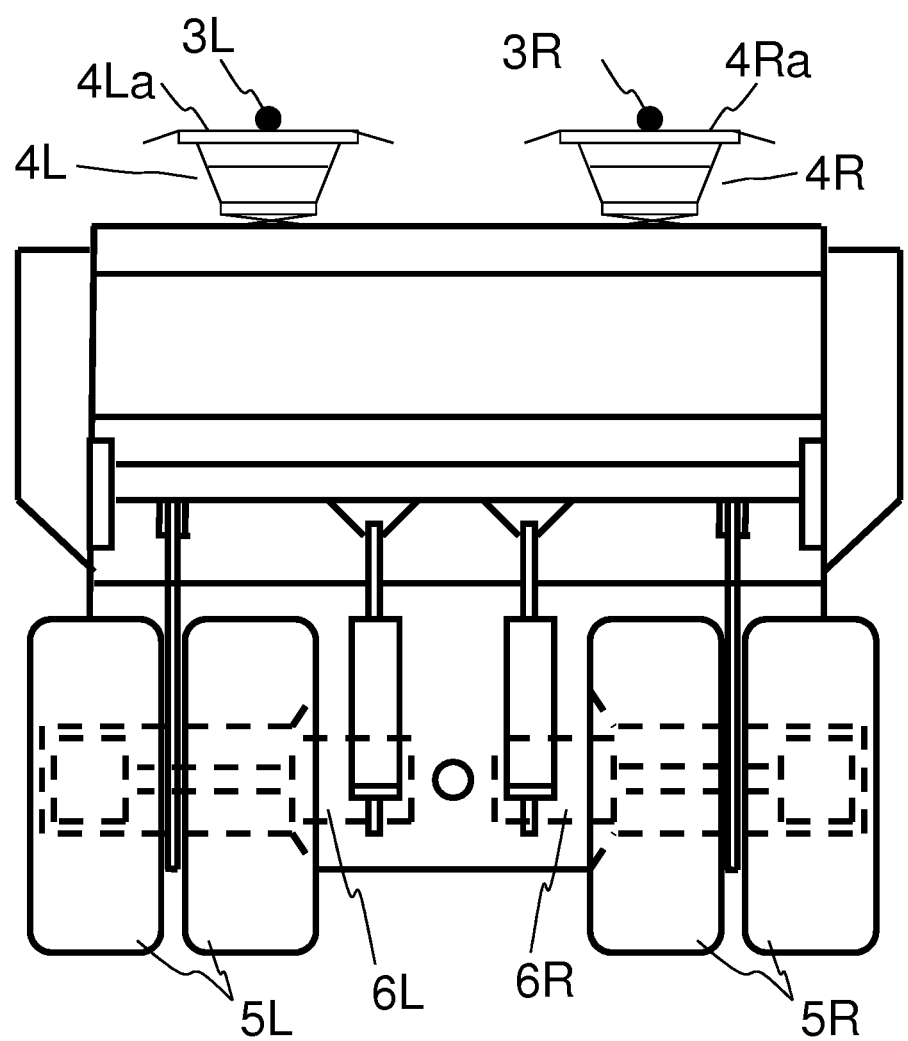
FIG. 2 is a rear view showing the external appearance of the dump truck.

FIG. 2 is a rear view showing the external appearance of the dump truck. Each rear wheel 5R, 5L is formed as a double-tire wheel to endure the load of earth, sand, etc. loaded on the vessel 2. The right and left double-tire wheels 5R and 5L are driven and braked by right and left electric motors 6R and 6L (e.g., induction motors).

Figure 3:
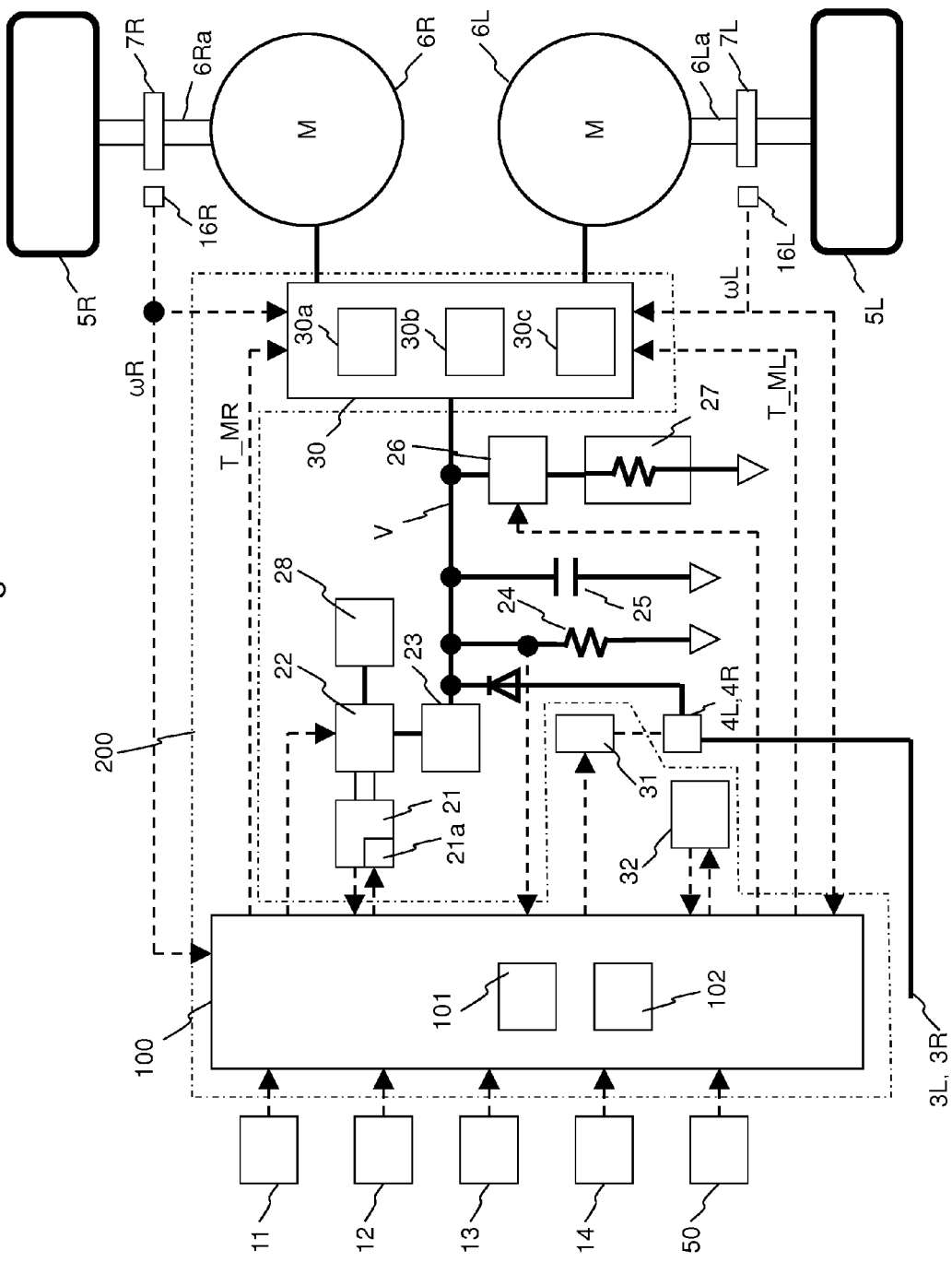
FIG. 3 is a schematic block diagram showing a drive system of the electrically driven dump truck in this embodiment.

FIG. 3 shows a drive system of the electrically driven dump truck of this embodiment.

In FIG. 3, the drive system of the electrically driven dump truck includes an accelerator pedal 11, a retarder pedal 12, a shift lever 13, a combined sensor 14, an engine 21, an AC generator 22, the other engine load 28, a rectifier circuit 23, a sensing resistor 24, a capacitor 25, a chopper circuit 26, a grid resistor 27, the power collectors 4R and 4L, the rear wheels 5R and 5L, the electric motors 6R and 6L, decelerators 7R and 7L, electromagnetic pickup sensors 16R and 16L, and a control device 200. The combined sensor 14 is used for sensing the forward/backward acceleration, the lateral acceleration and the yaw rate. The decelerators 7R and 7L are connected to output shafts 6Ra and 6La of the electric motors 6R and 6L, respectively.

The control device 200 includes an inverter control device 30, an elevation control device 31, a steering control device 32, a vehicle control device 50 and a controller 100. The inverter control device 30 controls the electric motors 6R and 6L according to torque commands inputted thereto. The elevation control device 31 moves the sliders 4Ra and 4La of the power collectors 4R and 4L up and down according to button operations by the driver or inputs from the outside. The steering control device 32 converts the driver's steering operation into an electric signal and thereby controls the steering of the front wheels. The vehicle control device 50 is a characteristic part of the present invention.

The inverter control device 30 includes a torque command calculation unit 30a, a motor control calculation unit 30b and an inverter (switching element) 30c (publicly-known configuration) for each of the right and left electric motors 6R and 6L. The power collectors 4R and 4L are equipped with elevators which move the sliders 4Ra and 4La up and down according to elevation command signals from the elevation control device 31. The details of the power collectors 4R and 4L, the elevation control device 31, the steering system (including the steering control device 32) and the vehicle control device 50 will be described later.

<Basic Operation Including Traveling>

The depressing level P (the degree of depressing) of the accelerator pedal 11 and the depressing level Q of the retarder pedal 12 are inputted to the controller 100 as signals for controlling the magnitude of the driving force and the retarding force (braking force), respectively. For example, when the driver depresses the accelerator pedal 11 to move the dump truck forward or backward, the controller 100 outputs a command regarding a target revolution speed Nr to the engine 21. The command regarding the target revolution speed Nr is outputted based on a preset table of target revolution speeds Nr corresponding to various accelerator angles. The engine 21 is a diesel engine equipped with an electronic governor 21a. Upon receiving the command regarding the target revolution speed Nr, the electronic governor 21a controls the fuel injection quantity so that the engine 21 revolves at the target revolution speed Nr.

The AC generator 22 is connected to the engine 21 to generate AC power. The electric power generated by the AC power generation is rectified by the rectifier circuit 23 and stored in the capacitor 25 (DC voltage: V). A voltage value detected by the sensing resistor 24 (dividing the DC voltage V at a certain ratio) is fed back to the controller 100. The AC generator 22 is controlled by the controller 100 receiving the feedback so that the voltage value equals a prescribed constant voltage V0.

The electric power generated by the AC generator 22 is supplied to the right and left electric motors 6R and 6L via the inverter control device 30. The controller 100 controls the supply of the necessary electric power to the electric motors 6R and 6L by controlling the AC generator 22 so that the DC voltage V acquired by the rectification by the rectifier circuit 23 equals the prescribed constant voltage V0. In contrast, when the sliders 4Ra and 4La of the power collectors 4R and 4L are in contact with the trolley wires 3R and 3L, the DC voltage V0 is directly supplied from the trolley wires 3R and 3L to the inverter control device 30.

The controller 100 calculates torque command values T_MR_a and T_ML_a corresponding to the operation amounts of the accelerator pedal 11 and the retarder pedal 12 and then generates and outputs torque command values T_MR and T_ML for the right and left electric motors 6R and 6L based on the torque command values T_MR_a and T_ML_a, torque command values $T_{13}$ MR_V and T_ML_V for vehicle speed control, and motor torque correction values T_MR_Y and T_ML_Y for yaw moment control (explained later). The torque command values T_MR and T_ML for the right and left electric motors 6R and 6L and the revolution speeds ωR and ωL of the electric motors 6R and 6L detected by the electromagnetic pickups 16R and 16L are inputted to the inverter control device 30. The inverter control device 30 drives each of the electric motors 6R and 6L via the torque command calculation unit 30a, the motor control calculation unit 30b and the inverter (switching element) 30c.

The right and left rear wheels (tires) 5R and 5L are connected to the electric motors 6R and 6L via the decelerators 7R and 7L, respectively. Each electromagnetic pickup 16R, 16L is generally implemented by a sensor which detects the peripheral speed of a cog of a gear inside the decelerator 7R, 7L. In the drive system for the right-hand side, for example, it is also possible to attach a gear for the detection to a drive shaft inside the electric motor 6R or to a drive shaft connecting the decelerator 7R to the wheel (tire) 5R and arrange the electromagnetic pickup 16R at the position of the gear.

When the driver of the traveling dump truck returns the accelerator pedal 11 and depresses the retarder pedal 12, the controller 100 executes control so that the AC generator 22 does not generate electric power. Further, the torque command values T_MR_a and T_ML_a from the controller 100 turn negative and thus the inverter control device 30 drives the electric motors 6R and 6L to give braking force to the traveling dump truck. In this case, the electric motors 6R and 6L function as generators so as to electrically charge the capacitor 25 by use of the rectification function of the inverter control device 30. The chopper circuit 26 operates to keep the DC voltage value V within a preset DC voltage value V1 while converting electric energy to thermal energy by feeding electric current to the grid resistor 27.

<Upward/Downward Movement of Sliders of Power Collectors>

Figure 4:
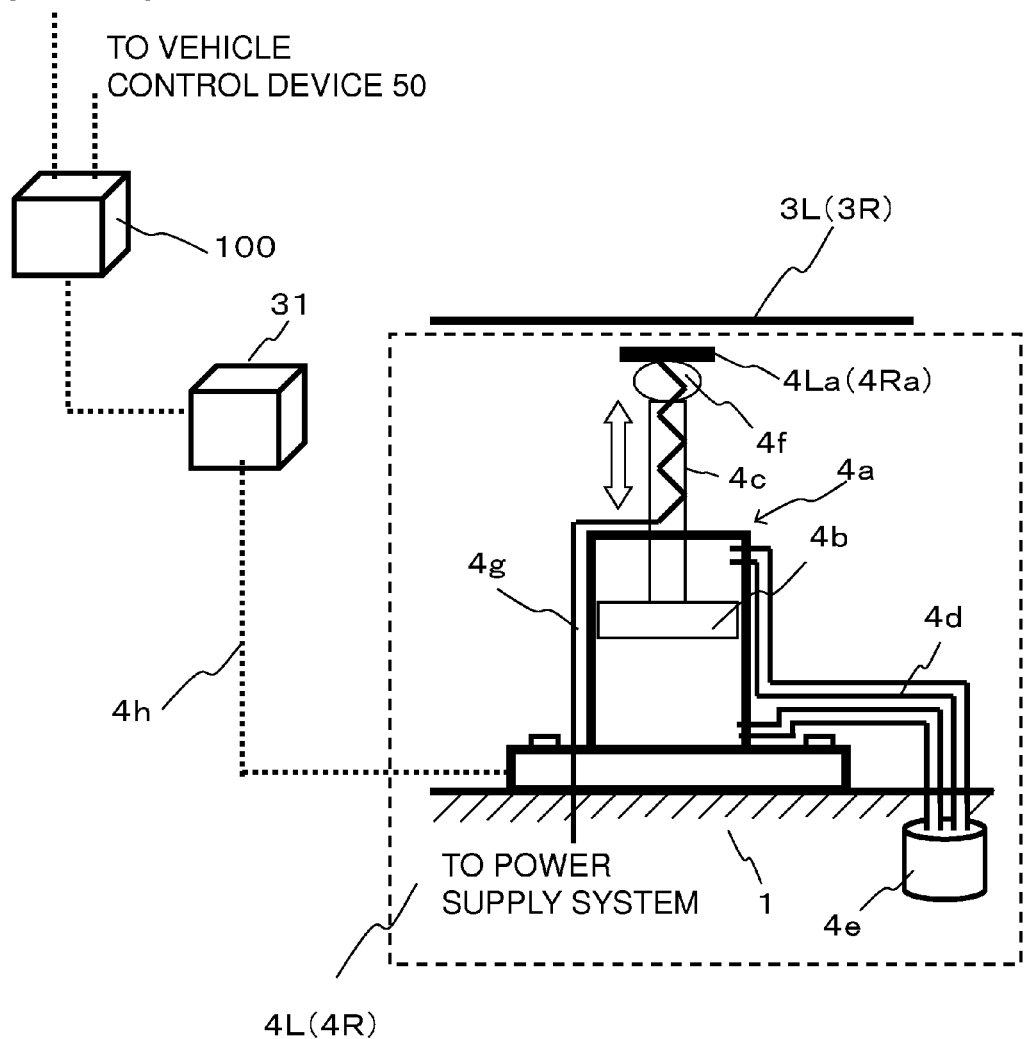
FIG. 4 is a schematic diagram showing the configuration of power collectors for receiving electric power from trolley wires.

Next, the elevators for the sliders 4Ra and 4La of the power collectors 4R and 4L will be explained below. FIG. 4 shows the configuration of the power collectors 4R and 4L for receiving the electric power from the trolley wires 3R and 3L. Since the power collectors 4R and 4L are identical with each other in the configuration, the configuration of the power collector 4L will be explained as a representative. The power collector 4L has a hydraulic piston device 4a as the elevator. The housing of the hydraulic piston device 4a is fixed on the vehicle 1. The slider 4La is attached to an end of a rod 4c of a hydraulic piston 4b of the hydraulic piston device 4a. The contact/detachment of the slider 4La to/from the trolley wire 3L is controlled by vertically moving the hydraulic piston 4b with hydraulic fluid supplied from a hydraulic device 4e (including a hydraulic pump) via a hydraulic line 4d. The slider 4La and the rod 4c of the hydraulic piston 4b are electrically insulated from each other by an insulator 4f. The electric power of the trolley wire 3L is supplied to a power supply system of the inverter control device 30 (for driving the motors, see FIG. 3) via the slider 4La and an electric wire 4g. The elevation control device 31 is configured to send the elevation command signal 4h to the hydraulic device 4e according to the driver's operation on an elevation switch or a switching (flag) operation or a control command signal from the outside (e.g., the vehicle control device 50 of the present invention). While the elevator for the slider 4La is implemented by the hydraulic piston device 4a in this embodiment, the elevator may of course be implemented by the system called "pantograph" by use of parallel linkage, spring, motor, etc. as is generally employed for electric trains.

<Steering System>

Figure 5:
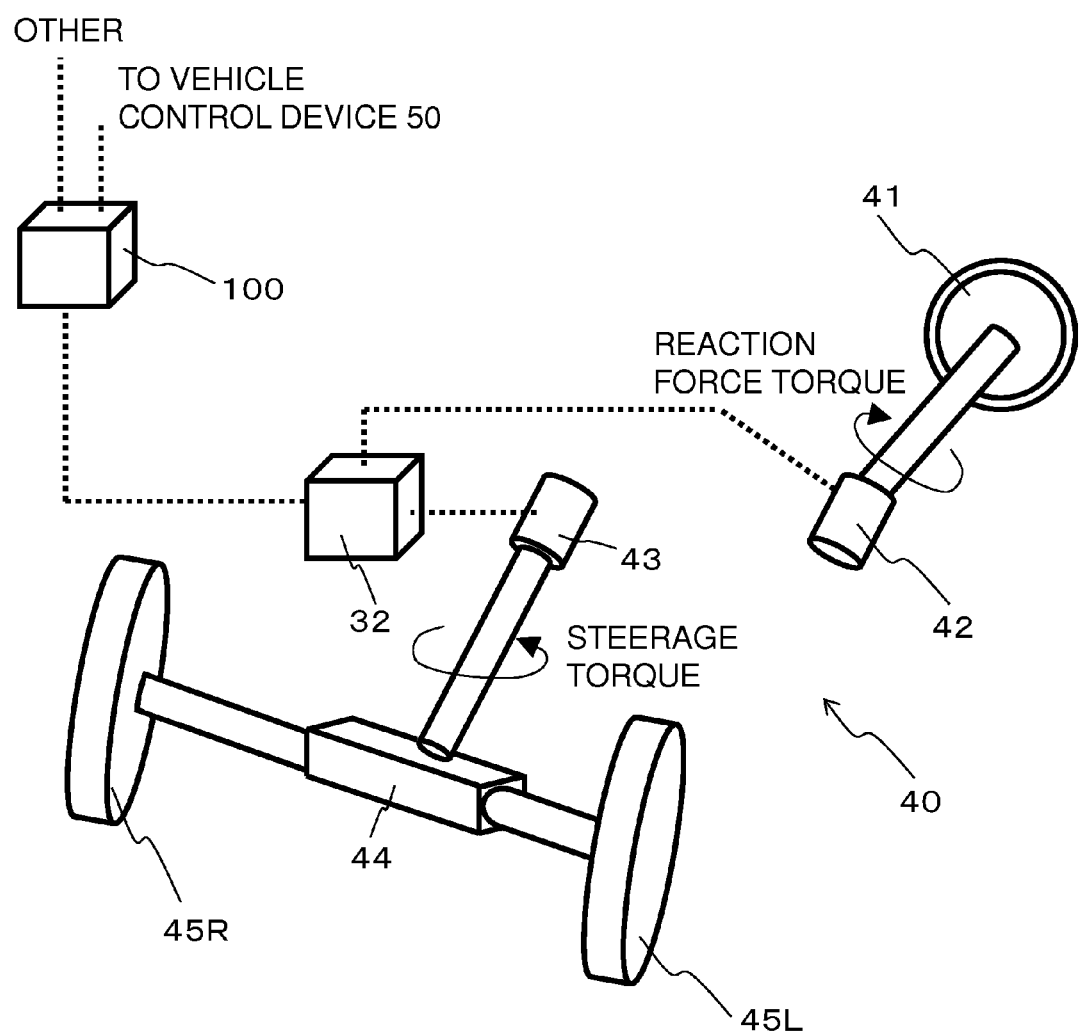
FIG. 5 is a schematic diagram showing a steering system which is made up of a steering control device and a steering device.

Next, the steering system will be explained below by referring to FIG. 5.

The steering system is made up of the aforementioned steering control device 32 and a steering device 40. The steering device 40 includes a steering wheel 41, a reaction force motor 42 having a steering angle sensor, a steerage motor 43 having a steerage angle sensor, and a rack-and-pinion gear 44.

When the driver operates the steering wheel 41, the steering angle sensor of the reaction force motor 42 detects the operation amount of the steering wheel 41 and sends the detected operation amount to the steering control device 32. The steering control device 32 sends a torque signal to the steerage motor 43 having the steerage angle sensor so that the present steerage angle equals a steerage angle corresponding to the steering angle of the driver. Front wheels 45R and 45L are turned (steerage) by steerage torque which is generated by the steerage motor 43 and transmitted via the rack-and-pinion gear 44. Depending on the magnitude of this torque, reaction force torque is transmitted to the reaction force motor 42 having the steering angle sensor, by which reaction force is transmitted to the steering wheel 41. At the same time, the steering control device 32 sends the steering angle to the controller 100. The steering control device 32 has a function of receiving a steerage torque correction value from the controller 100 and operating the steerage motor 43 (having the steerage angle sensor) according to the received steerage torque correction value. Whether the steering control device 32 similarly sends the reaction force torque to the reaction force motor 42 having the steering angle sensor or not can be changed properly based on the mode (explained later) at that time and a command from the controller 100. For example, if the steering control device 32 receiving the steerage torque correction value from the controller 100 operates the steerage motor 43 having the steerage angle sensor according to the correction value without sending the reaction force command value to the reaction force motor 42 having the steering angle sensor, the driver loses the steering feeling at that moment even though the vehicle (dump truck) turns according to the steering angle. In contrast, if no command is sent to the steerage motor 43 having the steerage angle sensor even with the steering operation by the driver, the vehicle (dump truck) does not turn in spite of the turning of the steering wheel 41. This means is effective when the controller 100 judges that the steering wheel 41 should not be operated for some reason, for example. As means for informing the driver that the steering wheel 41 should not be operated at the moment, the steering control device 32 may generate torque in a direction opposite to the direction of the driver's operation on the steering wheel 41. The torque makes the driver feel that the steering wheel 41 is heavy and recognize that the steering wheel 41 should not be operated in the direction.

While the steer-by-wire system in which the steering wheel 41 is not directly linked to the front wheels 45R and 45L has been explained in this embodiment, the steering system is not limited thereto. For example, an electric power steering system in which the reaction force motor 42 having the steering angle sensor and the steerage motor 43 having the steerage angle sensor are directly connected together as an integral component may also be employed. Further, the steerage motor 43 having the steerage angle sensor may also be implemented by a motor of the hydraulic servo type. Furthermore, the correction value sent from the controller 100 may also be a corrected angle instead of the torque. In this case, the steering control device 32 may be configured to perform torque feedback control so as to eliminate the deviation between the angle detected by the steerage angle sensor and the corrected angle.

Figure 6:
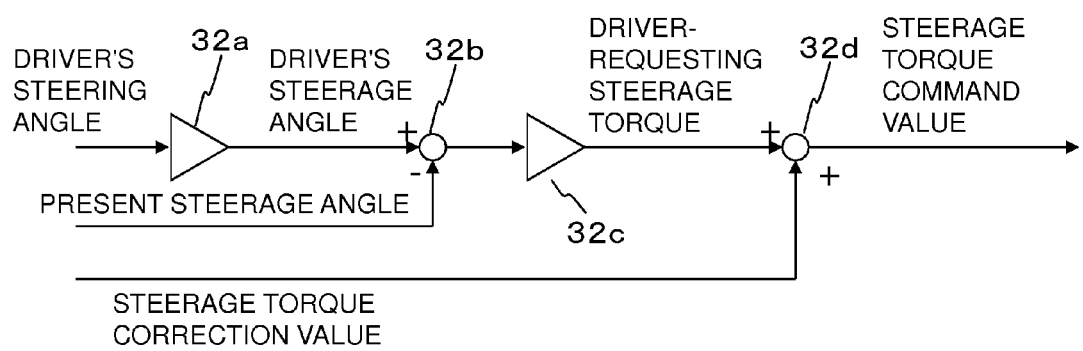
FIG. 6 is a block diagram showing a function of the steering control device for calculating a steerage torque command value.

FIG. 6 is a block diagram showing a function of the steering control device 32 for calculating a steerage torque command value. A conversion unit 32a of the steering control device 32 converts the driver's steering angle received from the reaction force motor 42 having the steering angle sensor into a driver steerage angle by multiplying the driver's steering angle by a gain factor. A calculation unit 32b subtracts the present steerage angle from the driver steerage angle. A conversion unit 32c converts the subtraction result into driver-requesting steerage torque by multiplying the subtraction result by a gain factor. Then, a calculation unit 32d calculates the steerage torque command value by adding the steerage torque correction value (received from the controller 100) to the driver-requesting steerage torque. The calculated steerage torque command value is outputted to the steerage motor 43 having the steerage angle sensor.

<Vehicle Speed Control>

Figure 7:
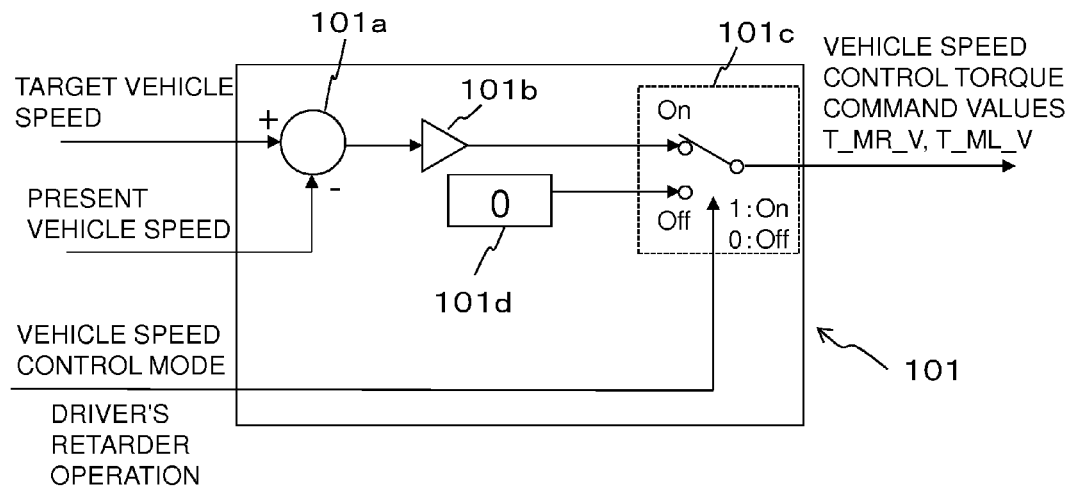
FIG. 7 is a block diagram for explaining a function of a vehicle speed control unit of a controller.

Referring again to FIG. 3, the controller 100 includes a vehicle speed control unit 101. When a vehicle speed control mode has been selected, the vehicle speed control unit 101 implements the control of the vehicle speed according to the vehicle speed control mode, by executing feedback control to the present vehicle speed with respect to a target vehicle speed that is set in the vehicle speed control mode. FIG. 7 is a block diagram for explaining the function of the vehicle speed control unit 101. As shown in FIG. 7, when the vehicle speed control mode is ON (1), that is, when a switch unit 101c is at its ON position, the vehicle speed control unit 101 receiving the target vehicle speed and the present vehicle speed calculates the difference between the two vehicle speeds with a calculation unit 101a, calculates the torque command values T_MR_V and T_ML_V (for changing the present vehicle speed to the target vehicle speed) with a conversion unit 101b by multiplying the difference by a gain factor, and outputs the calculated torque command values T_MR_V and T_ML_V. The vehicle speed control unit 101 receives revolution speeds ωR and ωL of the electric motors 6R and 6L detected by the electromagnetic pickups 16R and 16L and calculates the vehicle speed from the revolution speeds. A command specifying whether or not to shift to the vehicle speed control mode may be issued according to the driver's operation on a switch of the vehicle control device 50 or according to an input from the outside, for example. The cancellation of the vehicle speed control mode may be made according to the driver's depressing the retarder pedal 12 or according to an input from the outside. When the vehicle speed control mode is canceled, the command of the vehicle speed control mode is turned OFF (0) (i.e., the switch unit 101c is turned OFF) and a vehicle control torque command value 0 is outputted by a zero output unit 101d. The controller 100, having a preset table of engine revolution speed command values corresponding to various torque command values T_MR_V and T_ML_V, outputs an engine revolution speed command value to the engine 21 based on the table.

<Yaw Moment Control>

Figure 8:
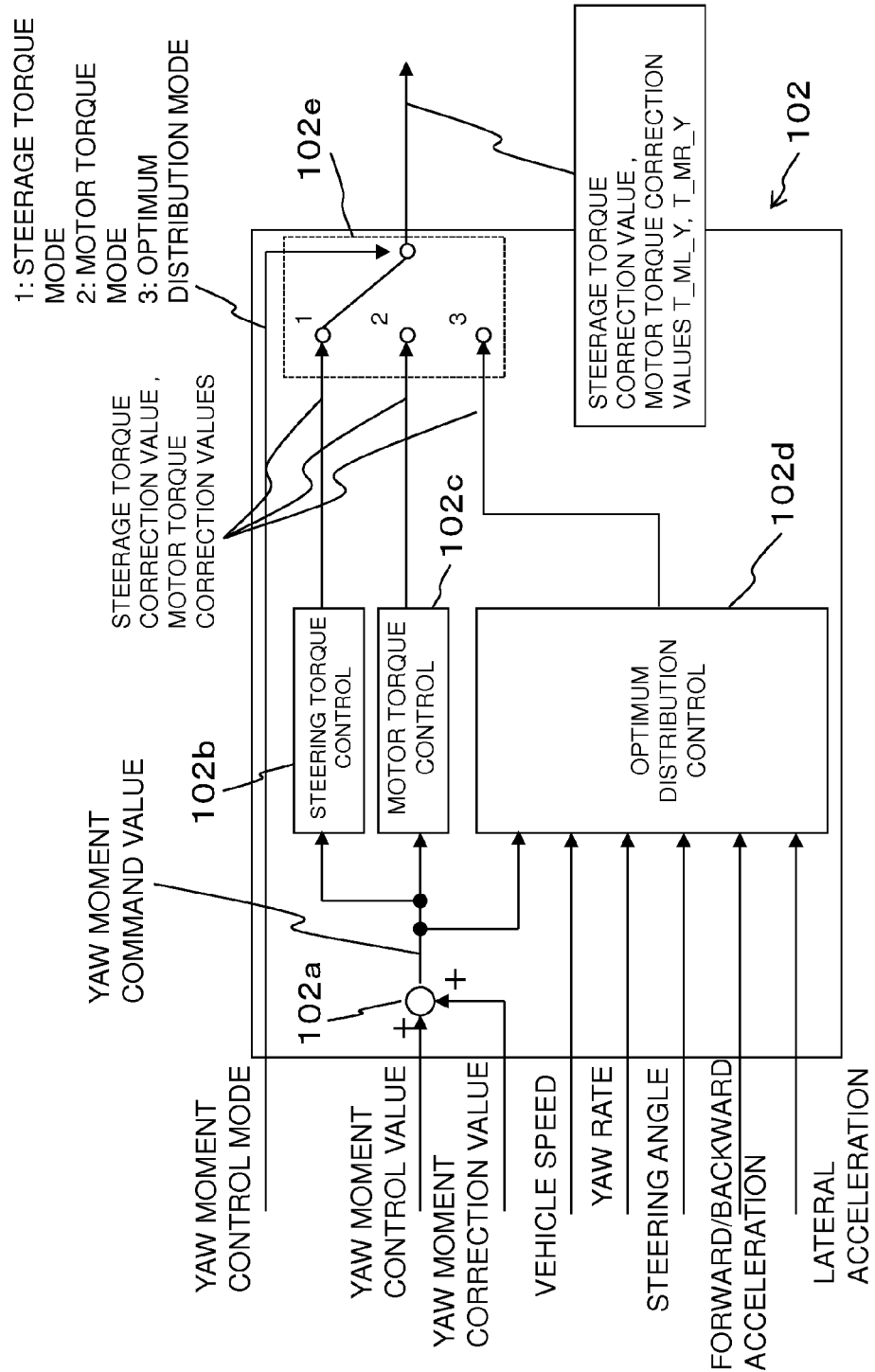
FIG. 8 is a block diagram showing the details of a function of a yaw moment control unit of the controller.

As shown in FIG. 3, the controller 100 further includes a yaw moment control unit 102 for controlling the turning direction of the vehicle. FIG. 8 is a block diagram showing the details of the function of the yaw moment control unit 102. As shown in FIG. 8, input signals to the yaw moment control unit 102 include, for example, a yaw moment control value which is generated by other yaw moment control (e.g., sideslip prevention control), a yaw moment correction value which is generated according to the present invention, the vehicle speed, the forward/backward acceleration, the lateral acceleration, the yaw rate, the steering angle, and a command of a yaw moment control mode. Output signals from the yaw moment control unit 102 are the steerage torque correction value and the torque correction values T_MR_Y and T_ML_Y for the motors. The yaw moment control value and the yaw moment correction value are added together by a calculation unit 102a to determine a yaw moment command value. The yaw moment command value is inputted to a steering torque control unit 102b, a motor torque control unit 102c and an optimum distribution control unit 102d. The steering torque control unit 102b calculates a steerage torque correction value based on the inputted yaw moment command value. The motor torque control unit 102c calculates motor torque correction values based on the inputted yaw moment command value. The optimum distribution control unit 102d calculates a yaw moment distribution ratio based on the yaw moment command value, the vehicle speed, the yaw rate, the steering angle, the forward/backward acceleration and the lateral acceleration inputted thereto and then calculates a steerage torque correction value and motor torque correction values corresponding to the yaw moment distribution ratio. The command of the yaw moment control mode is inputted to a switch unit 102e. When the yaw moment control mode is mode 1, the switch unit 102e outputs the steerage torque correction value calculated by the steering torque control unit 102b. When the yaw moment control mode is mode 2, the switch unit 102e outputs the motor torque correction value calculated by the motor torque control unit 102c. When the yaw moment control mode is mode 3, the switch unit 102e outputs the steerage torque correction value and the torque correction values for the right and left motors calculated by the optimum distribution control unit 102d.

<Setting of Yaw Moment Control Mode>

In mines where the dump trucks are traveling, there is an increasing request for the reduction of the time necessary for transporting earth, sand, etc. This is because the reduction of the necessary time shortens the earth/sand transportation cycle of each dump truck and increases the number of times of transportation. The vehicle speed is the major factor directly contributing to the reduction of the necessary time. Therefore, it is desirable to avoid control that causes a decrease in the vehicle speed.

Figure 9:
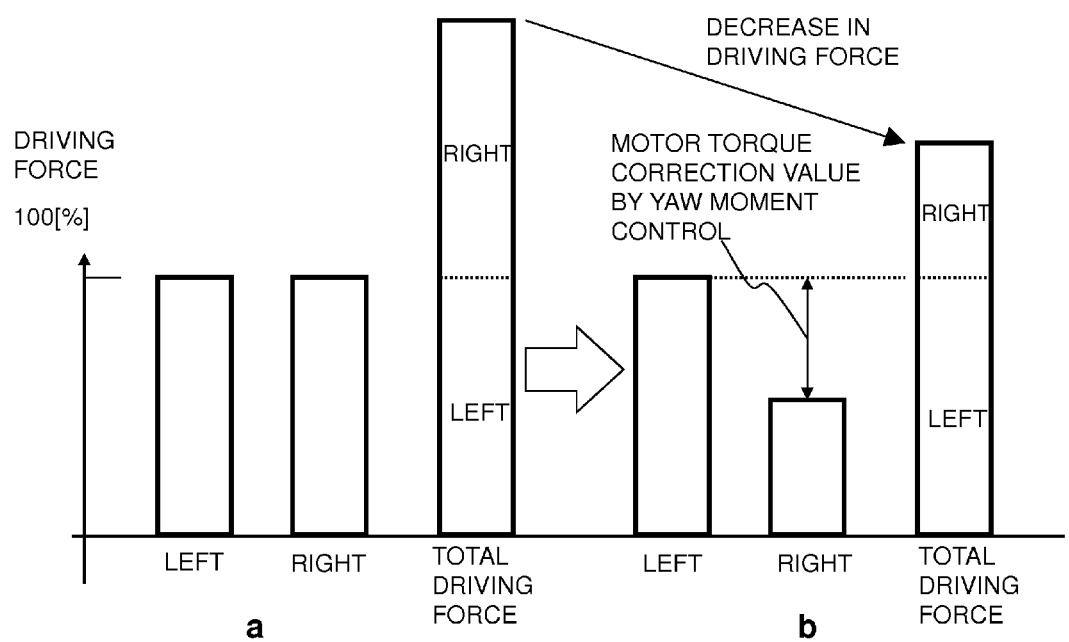
FIG. 9 is a graph showing the effect of a method implementing a yaw moment correction value by a driving force difference on the total driving force of the motors when the vehicle is traveling with its 100% motor driving force.

FIG. 9 is a graph showing the effect of a method implementing the yaw moment correction value by a driving force difference on the total driving force of the motors when the vehicle is traveling with its 100% motor driving force. For example, assuming that the vehicle is currently traveling at a constant speed with its 100% driving force as shown on the left side "a" of FIG. 9, the total driving force of the vehicle is in balance with the traveling resistance (air resistance, frictional resistance, slope angle, etc.). In the configuration of this embodiment, the "100% driving force" means the output limits of the rear wheel motors, that is, the maximum value of the driving force that the motors can output at that speed. Let us consider here the method of generating the yaw moment by giving driving/braking force to the vehicle. In this case, the generation of the yaw moment can only be achieved by decreasing the driving force of one of the right and left motors as shown on the right side "b" of FIG. 9 since the motors are already at their output limits as mentioned above. While a yaw moment corresponding to the decrease in the driving force is generated in the vehicle, the vehicle speed drops due to the decrease in the driving force. This goes against the aforementioned request for the time reduction. Therefore, the actuator that should generate the yaw moment in this case is desired to operate in a way not causing a considerable speed drop. Thus, setting the yaw moment control mode to the mode 1 as shown in FIG. 8 is appropriate in this case. In contrast, when the driving force of the vehicle is below 100%, the yaw moment control mode is switched to the motor torque control (yaw moment control mode 2) or the optimum distribution control (yaw moment control mode 3) depending on the magnitude of the driving force and other vehicle state quantities.

<Combining of Motor Torque Generated by Each Unit>

Figure 10:
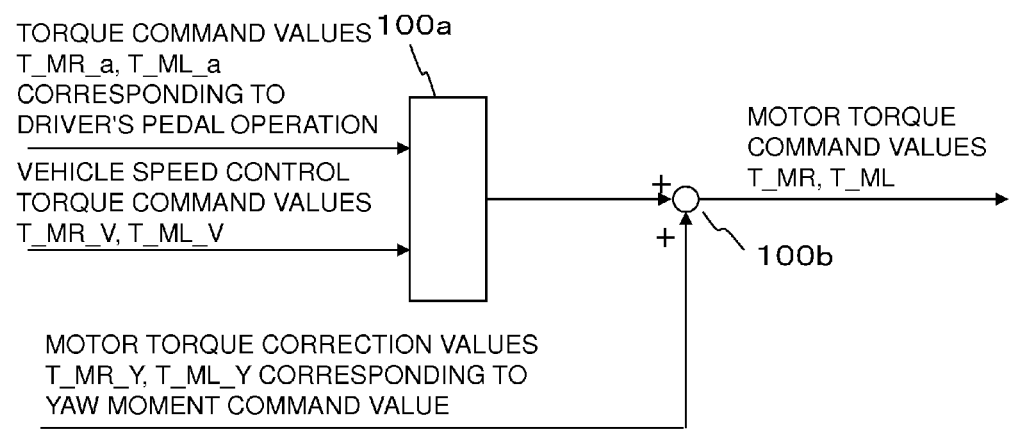
FIG. 10 is a schematic diagram showing an example of a method for calculating motor torque command values.

A method for the calculation of the motor torque command values by the controller 100 will be explained referring to FIG. 10. FIG. 10 is a schematic diagram showing an example of the method for calculating the motor torque command values. First, a processing unit 100a selects the aforementioned torque command values T_MR_a and T_ML_a corresponding to the driver's operation on the accelerator/retarder pedals or the torque command values T_MR_V and T_ML_V generated by the vehicle speed control. For example, the processing unit 100a selects the driver's torque command when it exists. Otherwise, the processing unit 100a selects the torque command for the vehicle speed control. Thereafter, a calculation unit 100b calculates motor torque command values T_MR and T_ML by adding the motor torque correction values T_MR_Y and T_ML_Y corresponding to the yaw moment command value generated by the yaw moment control unit 102 respectively to the torque command values selected by the processing unit 100a. This motor torque combining method is just an example; various other methods (e.g. publicly-known methods) may be used.

<Overall Configuration of Characteristic Part>

Next, the overall configuration of the characteristic part of the electrically driven dump truck in accordance with this embodiment will be explained below referring to FIG. 11.

As mentioned above, the drive system of the electrically driven dump truck of this embodiment includes the trolley wire detecting device 15 for detecting the trolley wires 3R and 3L and the vehicle control device 50.

The trolley wire detecting device 15 can be implemented typically by a sensor such as a laser radar, a millimeter wave radar or a camera. In an X-Y plane formed by an X-axis representing the traveling direction of the vehicle (direction of the vehicle axis) and a Y-axis representing the lateral direction (perpendicular to the vehicle axis) of the vehicle, any one of the above sensors serves in the present invention as means for detecting the relative positional relationship between the vehicle and the trolley wires. In the case of the laser radar, scanning (searching for the trolley wires) in the X-axis direction of the vehicle is effective for precisely detecting the trolley wires. In the case of the millimeter wave radar, ill effect of the weather (fog, rain, etc.) is lighter in comparison with other types of sensors. These radar sensors are capable of detection not only in the XY directions but also in the Z direction (height direction of the vehicle and the trolley wires). Therefore, the radar sensors can be suitable in cases where the system of the present invention is used together with a system needing the detection in the height direction.

In the case of the camera, images of the trolley wires are shot from below, and thus the trolley wires can be detected precisely in the daytime with fine weather thanks to high contrast between the sky and the trolley wires. It is also possible to equip the vehicle 1 with an illuminating device 51 for illuminating the trolley wires 3R and 3L. In this case, the illumination of the trolley wires 3R and 3L with the illuminating device 51 keeps high contrast between the sky and the trolley wires, by which the trolley wires can be detected precisely even when such high contrast is hardly achieved (evening, nighttime, rainy weather, etc.).

The system may also be constructed by combining two or more sensors.

Figure 11:
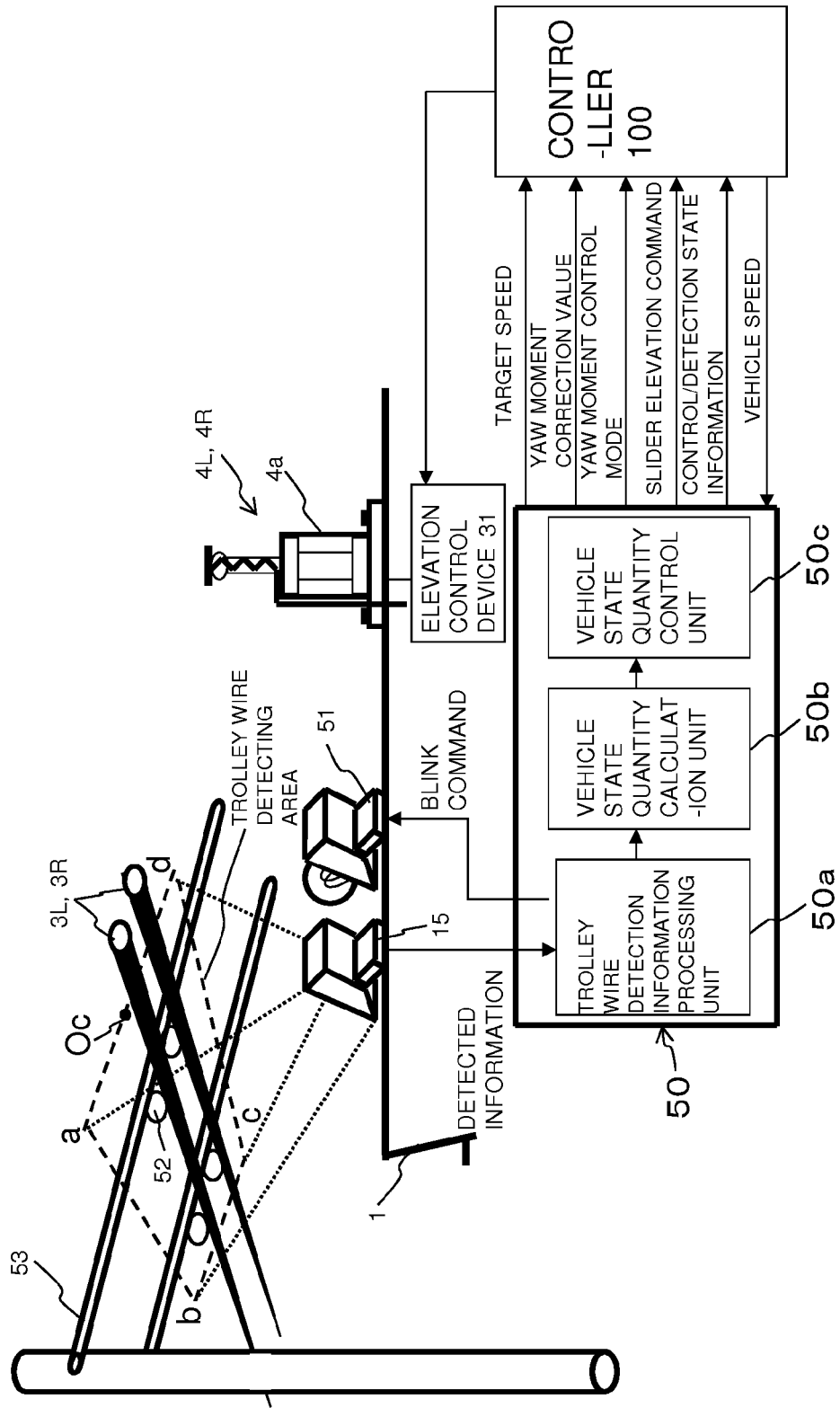
FIG. 11 is a schematic diagram showing the configuration of a vehicle control device and the input-output relationship between the vehicle control device and the controller.

FIG. 11 is a schematic diagram showing the configuration of the vehicle control device 50 and the input-output relationship between the vehicle control device 50 and the controller 100. As shown in FIG. 11, the vehicle control device 50 includes a trolley wire detection information processing unit 50a, a vehicle state quantity calculation unit 50b, and a vehicle state quantity control unit 50c. The trolley wire detection information processing unit 50a acquires information on the relative positional relationship between the vehicle and the trolley wires by processing information detected by the trolley wire detecting device 15. The vehicle state quantity calculation unit 50b calculates state quantities of the vehicle based on the information acquired by the trolley wire detection information processing unit 50a. The vehicle state quantity control unit 50c controls the vehicle state quantities based on the result of the calculation by the vehicle state quantity calculation unit 50b. The trolley wires 3R and 3L are supported by supports 53 via insulators 52. The vehicle control device 50 outputs a target speed correction value, the yaw moment correction value, the yaw moment control mode, the elevation control device elevation command, control/detection state information, etc.

In this embodiment, the explanation of the detection of the trolley wires will be given of a case where a camera is used as the trolley wire detecting device 15 and the relative positional relationship between the vehicle and the trolley wires in the X-Y plane is detected by performing image processing. Thus, the trolley wire detecting device 15 is implemented by a camera and the trolley wire detection information processing unit 50a is implemented by an image information processing unit which processes the image information captured by the camera 15.

<Camera 15 and Image Information Processing Unit 50a>

The camera 15 captures images of the trolley wires 3R and 3L. In this case where the two trolley wires 3R and 3L are shot by one camera, the camera 15 is desired to be placed at the center of the right and left trolley wires 3R and 3L. It is also possible to shoot each of the right and left trolley wires 3R and 3L respectively with one camera. The image information captured by the camera 15 is sent to the image information processing unit 50a of the vehicle control device 50. The image information represents pixel arrangement in the area shot by the camera 15. The image information processing unit 50a converts the image information into necessary information.

When a strong light source exists in the shooting direction of the camera 15, a whitening and blurring effect called "halation" can occur to the image inputted to the image information processing unit 50a and this can disable the recognition of the target of detection. As a countermeasure against this problem, it is possible to use two cameras: one for shooting the trolley wires 3R and 3L in front of the vehicle and another for shooting the trolley wires 3R and 3L in back of the vehicle. When the image information processing unit 50a judges that the halation has occurred in an image captured by one camera, a correction can be made by use of the other camera. The halation can be detected according to publicly known methods. The two-camera configuration is effective not only when the halation occurs but also when the visual field of one camera is blocked. When the image information processing unit 50a judges that the visual field of one camera is blocked by dirt, mud, etc., a correction can be made similarly by using the other camera. It is also possible to enclose the camera 15 with a housing, make the camera 15 shoot the trolley wires 3R and 3L through glass of the housing, and wash the glass with a wiper, washer fluid, etc. when the image information processing unit 50a judges that the visibility through the glass has been deteriorated by dirt, mud, etc.

When the image information processing unit 50a judges that the amount of ambient light is insufficient for the detection of the trolley wires 3R and 3L (twilight, darkness, etc.), the image information processing unit 50a may output a blink command to the illuminating device 51 to make the illuminating device 51 illuminate the trolley wires 3R and 3L and maintain high contrast between the sky and the trolley wires.

Figure 12:
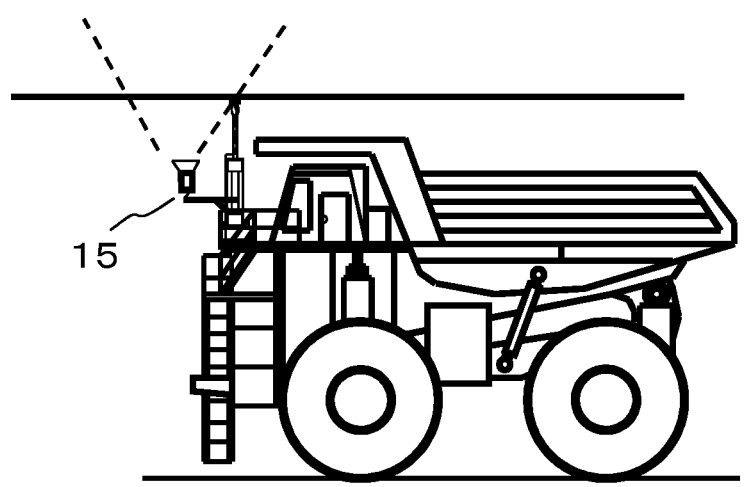
FIG. 12 is a schematic diagram showing the positional relationship between the vehicle and an imaging area of a camera viewed from the side of the vehicle.
Figure 13:
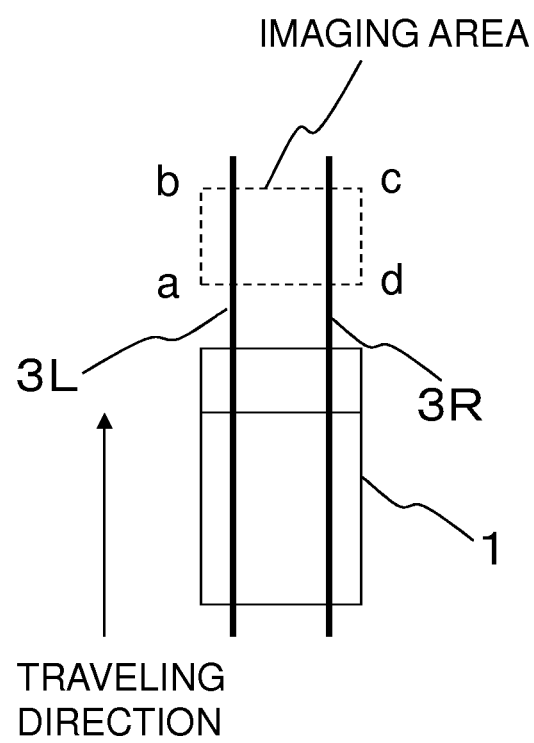
FIG. 13 is a schematic diagram showing the positional relationship between the vehicle and the imaging area of the camera viewed from above (above the vehicle).
Figure 14:
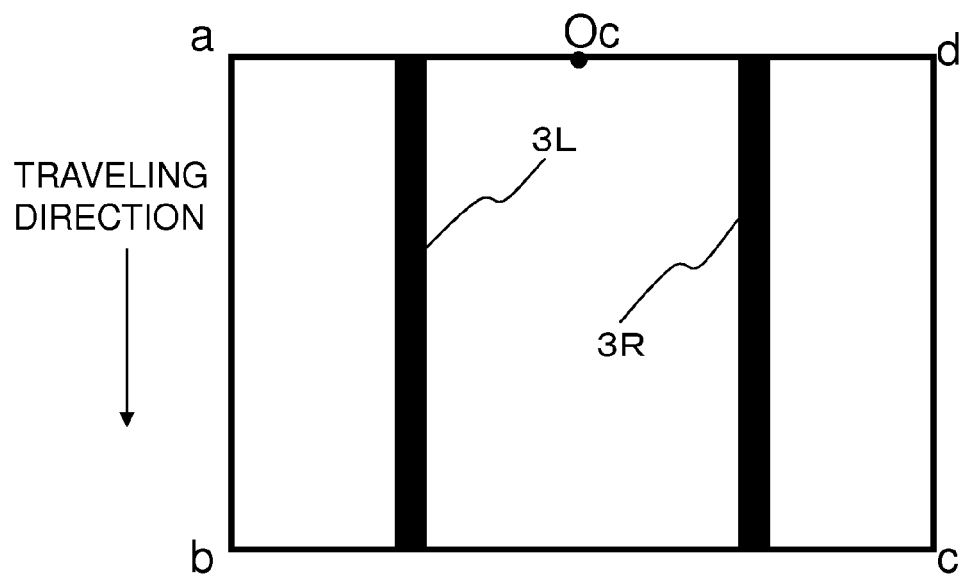
FIG. 14 is a schematic diagram showing an image captured by the camera.

In this embodiment, a case where the camera 15 captures images in the direction directly above the vehicle as shown in FIG. 12 (not in the oblique direction as shown in FIG. 11) will be considered for the simplicity of the explanation. In this case, an imaging area a, b, c, d of the camera 15 (detecting area of the trolley wire detecting device) is set in front of the vehicle as shown in FIG. 13. FIG. 14 is a schematic diagram showing an image captured by the camera 15 in this case. Since the camera 15 has shot the image of the trolley wires 3R and 3L from below in FIG. 14, the anteroposterior relationship among the points a, b, c and d (positional relationship between the line a-d and the line b-c) and the traveling direction of the vehicle are opposite to those in FIG. 13 in which the trolley wires 3R and 3L are viewed from above.

Figure 15:
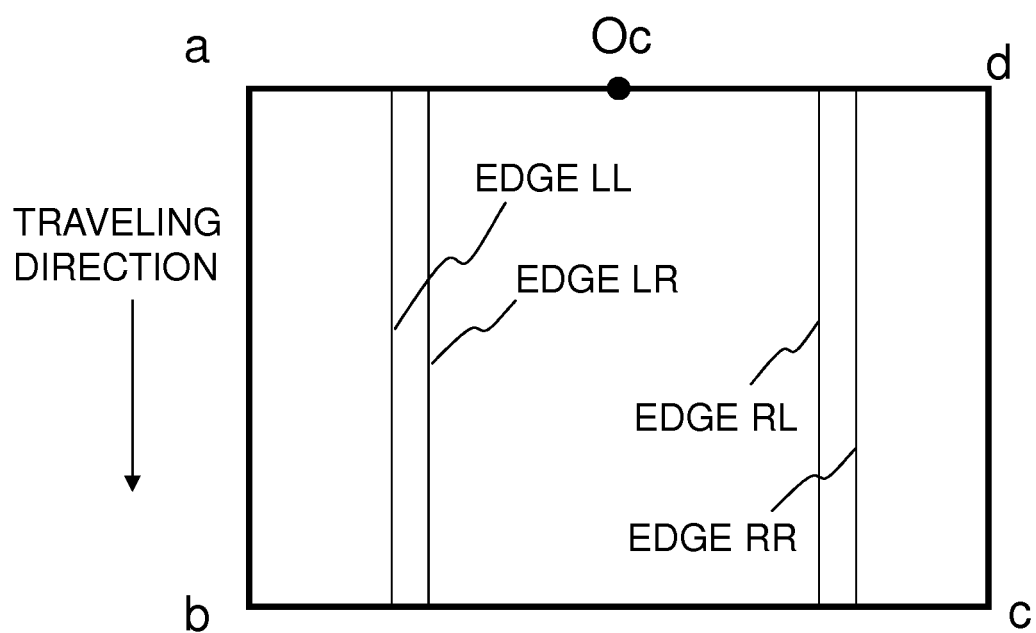
FIG. 15 is a schematic diagram showing a process (edge extraction) performed on the captured image.
Figure 16:
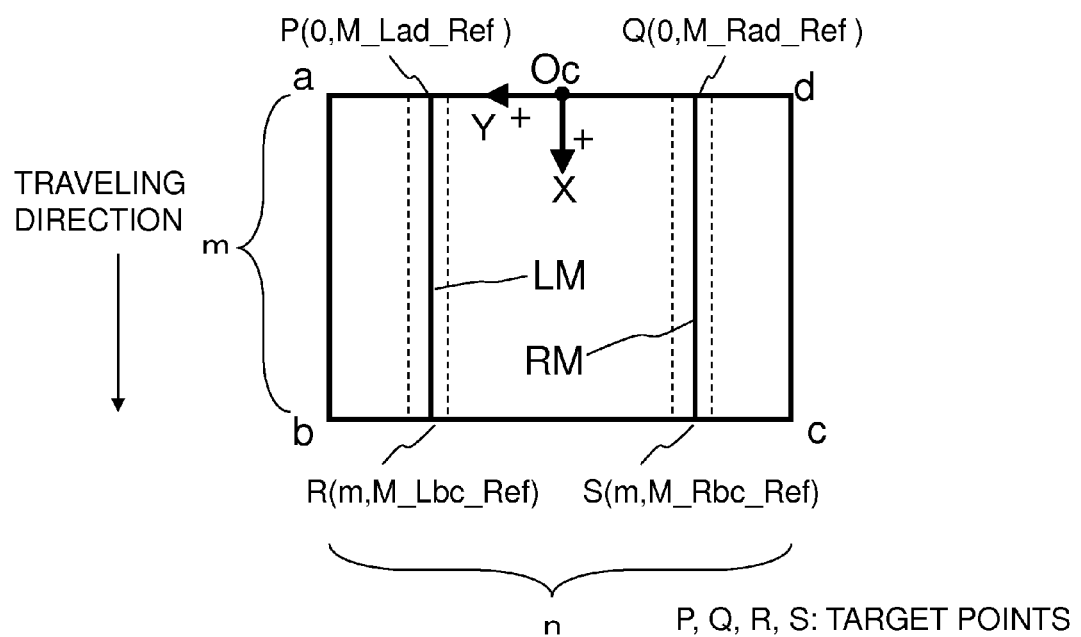
FIG. 16 is a schematic diagram showing a process (center line extraction) performed on the captured image.

As shown in FIG. 14, in the image information acquired by the camera 15, the trolley wires 3R and 3L appear in parallel with the traveling direction (in the vertical direction in the image). On this image information, a process for extracting edge parts (edging process) is performed as shown in FIG. 15. By the edging process, the right trolley wire 3R is split into edges RR and RL, while the left trolley wire 3L is split into edges LR and LL. Subsequently, as shown in FIG. 16, a center line of the edges is determined for each of the right and left trolley wires 3R and 3L (a center line RM for the right trolley wire 3R and a center line LM for the left trolley wire 3L). Then, a coordinate system in regard to the pixel number is set with its origin situated at the top center Oc of the image (with its X-axis extending in the direction parallel to the line ab and its Y-axis extending in the direction parallel to the line da). Subsequently, the intersection point P (0, M_Lad_Ref) of the center line LM and the line ad, the intersection point Q (0, M_Rad_Ref) of the center line RM and the line ad, the intersection point R (m, M_Lbc_Ref) of the center line LM and the line bc, and the intersection point S (m, M_Rbc_Ref) of the center line RM and the line bc are set with respect to the origin Oc. These points P, Q, R and S, existing on the trolley wires 3R and 3L, are defined as target points. Incidentally, the number "m" represents the number of pixels in the vertical direction and the number "n" represents the number of pixels in the horizontal direction.

If each trolley wire 3R, 3L is situated at the center of each slider 4Ra, 4La when the vehicle is traveling straight at the center of the two trolley wires 3R and 3L and in parallel with the trolley wires 3R and 3L, this serves as robustness against deviations (displacement) caused by lateral (right/left) misalignment and vibration (jolting) of the vehicle. Therefore, the vehicle is desired to keep on traveling in such a state.

Figure 17:
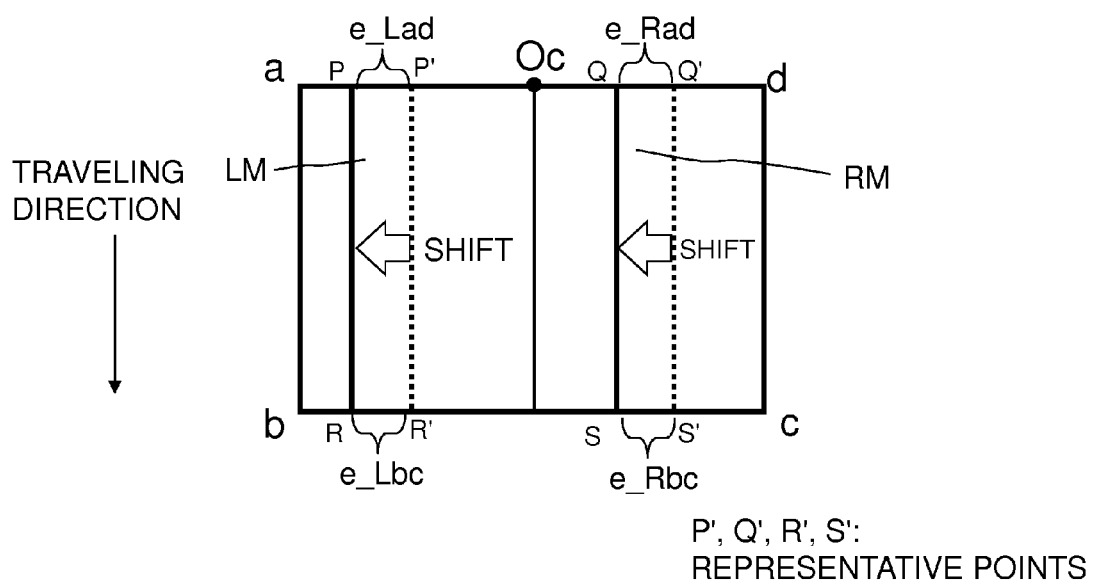
FIG. 17 is a schematic diagram showing a camera image captured when the vehicle has shifted to the left with respect to the trolley wires.

FIG. 17 shows a state in which the vehicle has shifted to the left. By setting representative points of the vehicle 1 at intersection points of lines parallel to the X-axis (i.e., in the traveling direction of the vehicle 1) and passing through the center of the slider 4Ra or 4La and the lines ad and bc of the imaging area, the points P', Q', R' and S' shown in FIG. 17 are acquired as the representative points. These representative points are points used for controlling the position of the vehicle with respect to the trolley wires 3R and 3L. Therefore, the representative points P', Q', R' and S' can also be referred to as control points. Coordinates of these representative points are defined as M_Lad_Cont, M_Rad_Cont, M_Lbc_Cont and M_Rbc_Cont, respectively.

Figure 18:
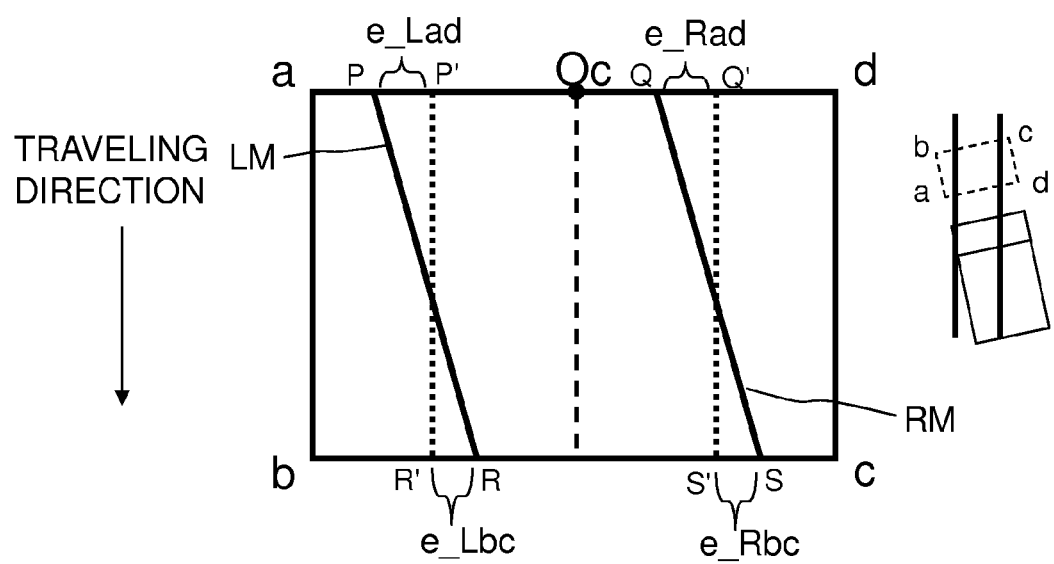
FIG. 18 is a schematic diagram showing a camera image captured when the vehicle is traveling obliquely to the trolley wires.

FIG. 18 shows a case where the vehicle is traveling obliquely to the trolley wires 3R and 3L. Also in this case, the representative points of the vehicle are defined as the points P', Q', R' and S'.

The image information processing unit 50a sends the coordinate information on these points to the vehicle state quantity calculation unit 50b.

<Vehicle State Quantity Calculation Unit 50b and Vehicle State Quantity Control Unit 50c>

The vehicle state quantity calculation unit 50b is a component for calculating state quantities to be used for generating control values and command values such as the yaw moment correction value, the elevation control device elevation command, the yaw moment control mode and the target speed correction value. The yaw moment correction value is used for executing control for giving an appropriate yaw moment to the vehicle 1 so that the vehicle 1 travels while tracing the trolley wires 3R and 3L (hereinafter referred to as "trolley wire tracing control" as needed). The elevation control device elevation command is issued for the elevation control of the slider 4Ra or 4La of the power collectors 4R and 4L (hereinafter referred to as "slider elevation control" as needed). The vehicle state quantity control unit 50c is a component for generating and outputting the control values and the command values (the yaw moment correction value, the elevation control device elevation command, the yaw moment control mode, the target speed correction value, etc.) based on the result of the calculation by the vehicle state quantity calculation unit 50b.

<Trolley Wire Detecting Area and Coordinate System>

First, a trolley wire detecting area and a coordinate system used by the vehicle state quantity calculation unit 50b will be explained below.

Figure 19:
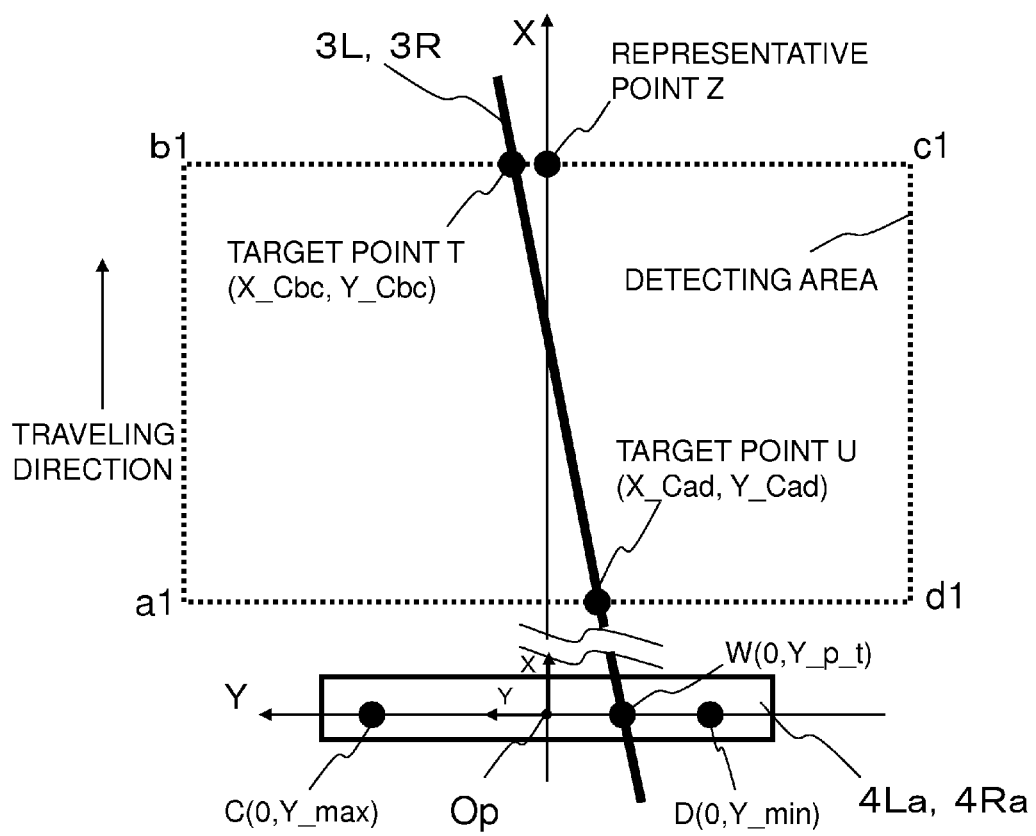
FIG. 19 is a schematic diagram showing a trolley wire detecting area and a coordinate system when the positional relationship between the trolley wires and sliders is viewed from above.

FIG. 19 is a schematic diagram showing the trolley wire detecting area and the coordinate system used in this embodiment.

From the image information on the imaging area a, b, c, d (see FIGS. 16-18) acquired by the image information processing unit 50a from the camera 15, the vehicle state quantity calculation unit 50b extracts and acquires an area like the area a1, b1, c1, d1 shown in FIG. 19 as the trolley wire detecting area. The side a1-d1 corresponds to a part of the side a-d of the imaging area a, b, c, d shown in FIGS. 16-18, while the side b1-c1 corresponds to a part of the side b-c of the imaging area a, b, c, d. The trolley wire detecting area a1, b1, c1, d1 indicates the positional relationship between the slider) and the trolley wire 3R or 3L when the trolley wire 3R/3L is viewed from above. In the trolley wire detecting area a1, b1, c1, d1, a straight line passing through the center of the slider 4Ra/4La (regarding the lateral direction) and extending in the traveling direction of the vehicle passes through the center of the side a1-d1 and the center of the side b1-c1. As mentioned above, since the trolley wires 3R and 3L are shot from below in the image information on the imaging area a, b, c, d acquired by the camera 15, the anteroposterior relationship (vertical direction in FIG. 19) in the trolley wire detecting area a1, b1, c1, d1 (viewing the trolley wire 3R/3L from above) is opposite to that in the imaging area a, b, c, d.

Further, the vehicle state quantity calculation unit 50b sets a coordinate system having the origin (Op) at the center of the slider 4Ra/4La, the X-axis extending in the traveling direction, and the Y-axis extending leftward with respect to the traveling direction. In the coordinate system, the vehicle state quantity calculation unit 50b sets a representative point at the intersection point Z of the X-axis and the side b1-c1, and sets two target points at the intersection point T of the trolley wire 3R/3L and the side b1-c1 and at the intersection point U of the trolley wire 3R/3L and the side a1-d1. Since the camera 15 and the slider 4Ra/4La of the power collector 4R/4L are both attached to the vehicle and the positional relationship between the two components are already known, the coordinates of the intersection points Z, T and U can be determined with ease by means of coordinate transformation, by transforming coordinate values of the points P', P and R in the coordinate system with the origin Oc shown in FIGS. 16-18 into coordinate values in the coordinate system with the origin Op shown in FIG. 19.

<Trolley Wire Tracing Control>

The vehicle state quantity calculation unit 50b calculates the deviation between the representative point Z and the target point T. Since the Y-coordinate value $Y\_Cbc$ of the target point T in front of the slider 4Ra/4La equals the deviation between the representative point Z and the target point T, the vehicle state quantity calculation unit 50b uses the Y-coordinate value $Y\_Cbc$ of the target point T as the deviation between the representative point Z and the target point T. The deviation $Y\_Cbc$ takes on a positive/negative value when the vehicle has shifted rightward/leftward with respect to the trolley wires.

When the vehicle is traveling obliquely to the trolley wire 3R/3L, similar displacement is defined also in regard to the inclination of the vehicle. In this case, the inclination $\theta\_t$ of the vehicle with respect to the trolley wire 3R/3L at a certain time t is represented by the following expression by using the coordinate values of the two target points T and U:

$$\theta\_t = (Y\_Cbc - Y\_Cad)/(X\_Cbc - X\_Cad) \qquad (1)$$

The vehicle state quantity control unit 50c calculates the yaw moment correction value (for making the representative point Z coincide with the target point T) by using the deviation $Y\_Cbc$ between the representative point Z and the target point T or the inclination $\theta\_t$ of the vehicle.

Figure 20:
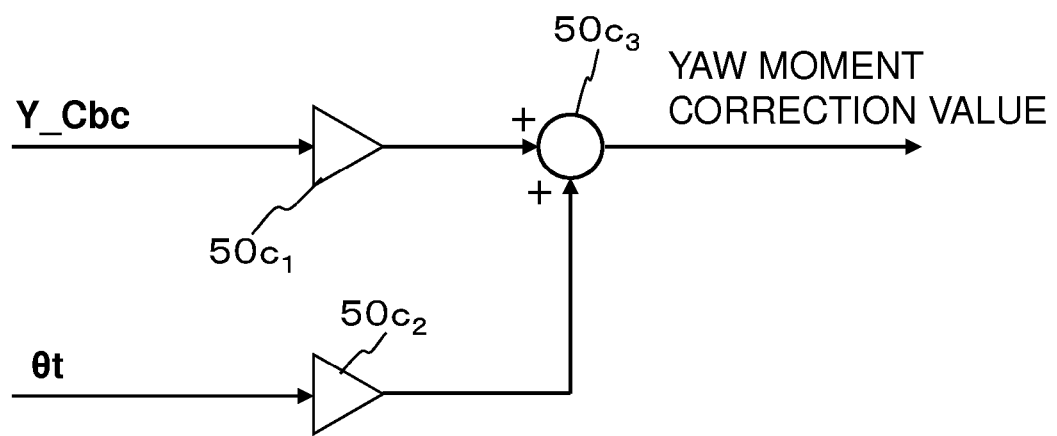
FIG. 20 is a block diagram showing the details of a function of a vehicle state quantity control unit (an example of a method for calculating the yaw moment correction value corresponding to the position of a target point).

FIG. 20 is a block diagram showing a process for calculating the yaw moment correction value by using the deviation $Y\_Cbc$ or the inclination $\theta\_t$. In the vehicle state quantity control unit 50c, a conversion unit $50c_1$ converts the deviation $Y\_Cbc$ into a yaw moment value by multiplying the deviation $Y\_Cbc$ by a gain factor. Similarly, a conversion unit $50c_2$ converts the inclination $\theta\_t$ into a yaw moment value by multiplying the inclination $\theta\_t$ by a gain factor. A calculation unit $50c_3$ calculates the yaw moment correction value by adding the two yaw moment values together and outputs the calculated yaw moment correction value to the yaw moment control unit 102.

The vehicle state quantity control unit 50c also determines the yaw moment control mode which has been explained referring to FIG. 8. The aforementioned yaw moment control unit 102 of the controller 100 calculates the motor torque command values and the steerage torque correction value based on the yaw moment correction value and the yaw moment control mode determined by the vehicle state quantity control unit 50c and then outputs the motor torque command values and the steerage torque correction value to the inverter control device 30 and the steering control device 32, respectively.

With the configuration and operation described above, the control device (made up of the vehicle control device 50, the controller 100, the inverter control device 30 and the steering control device 32) executes control to give an appropriate yaw moment to the vehicle 1 so that the vehicle 1 travels while tracing the trolley wires 3R and 3L. In this case, the control device carries out control to give an appropriate yaw moment to the vehicle 1 so that the representative point Z approaches the target point T. Further, the control device carries out control to give an appropriate yaw moment to the vehicle 1 so that the inclination $\theta\_t$ decreases.

Besides the simple gain control shown in FIG. 20, integral control, derivative control, etc. may also be employed.

<Slider Elevation Control>

The vehicle state quantity calculation unit 50b calculates the inclination $\theta\_t$ of the vehicle at a certain time t. As mentioned above, this inclination $\theta\_t$ can be calculated according to the above expression (1) by using the coordinate values of the two target points T and U shown in FIG. 19.

Further, the vehicle state quantity calculation unit 50b calculates the Y-coordinate ($Y\_p\_t$) of a point W which is defined as the intersection point of the slider 4Ra/4La and the trolley wire 3R/3L.

The Y-coordinate $Y\_p\_t$ of the point W can be approximated as follows:

$$Y\_p\_t = Y\_Cbc - \theta\_t \times X\_Cbc \text{ or}$$

$$Y\_p\_t = Y\_Cad - \theta\_t \times X\_Cad \qquad (2)$$

Here, $Y\_P\_t+1$ as the value of $Y\_p\_t$ one step later (after a time interval $\Delta$) is expressed by using the vehicle speed V as follows:

$$Y\_p\_t+1 = Y\_p\_t + V \times \tan\theta\_t \qquad (3)$$

Assuming that the permissible range of the Y-coordinate $Y\_p\_t$ of the point W on the slider 4Ra/4La, within which the slider 4Ra/4La is in contact with the trolley wire 3R/3L and satisfactory electric power can be acquired continuously, is $Y\_min$ (Y-coordinate of a point D) $< Y\_p\_t < Y\_max$ (Y-coordinate of a point C) between points C and D, it can be said that there is no problem with elevating the slider 4Ra/4La in a range satisfying $Y\_min < Y\_p\_t+1 < Y\_max$.

At the present time t, the vehicle state quantity calculation unit 50b judges whether or not the Y-coordinate $Y\_p\_t$ of the point W will be outside the range between $Y\_min$ (Y-coordinate of the point D) and $Y\_max$ (Y-coordinate of the point C) in the next control step t+1, and outputs the result of the judgment to the vehicle state quantity control unit 50c. If the Y-coordinate $Y\_p\_t$ of the point W will be outside the range between $Y\_min$ (Y-coordinate of the point D) and $Y\_max$ (Y-coordinate of the point C), the vehicle state quantity control unit 50c outputs a command signal for lowering the sliders 4Ra and 4La or prohibiting the elevation of the sliders 4Ra and 4La. In contrast, if the Y-coordinate $Y\_p\_t$ will be within the range, the vehicle state quantity control unit 50c outputs a command signal for elevating the sliders 4Ra and 4La or permitting the elevation of the sliders 4Ra and 4La. The vehicle state quantity control unit 50c may also correct the reaction force of the reaction force motor 42 (see FIG. 5) of the steering device 40 depending on the Y-coordinate $Y\_p\_t$ of the point W. For example, the correction may be made to decrease the reaction force in the range satisfying Y_min<Y_p_t+1<Y_max and to increase the reaction force in the ranges satisfying Y_p_t+1≤Y_min or Y_max≤Y_p_t+1.

In this example, the vehicle control device 50 is executing both the trolley wire tracing control and the slider elevation control. In the trolley wire tracing control, the vehicle state quantity control unit 50c outputs the yaw moment correction value calculated by multiplying the deviation Y_Cbc or the inclination θ_t by a gain factor. Since the outputting of the yaw moment correction value continues until the deviation Y_Cbc or the inclination θ_t becomes 0, the Y-coordinate Y_p_t of the point W on the slider 4Ra/4La and the inclination θ_t of the vehicle tend to converge on 0 eventually.

<Details of Control Process by Vehicle Control Device 50>

Figure 21:
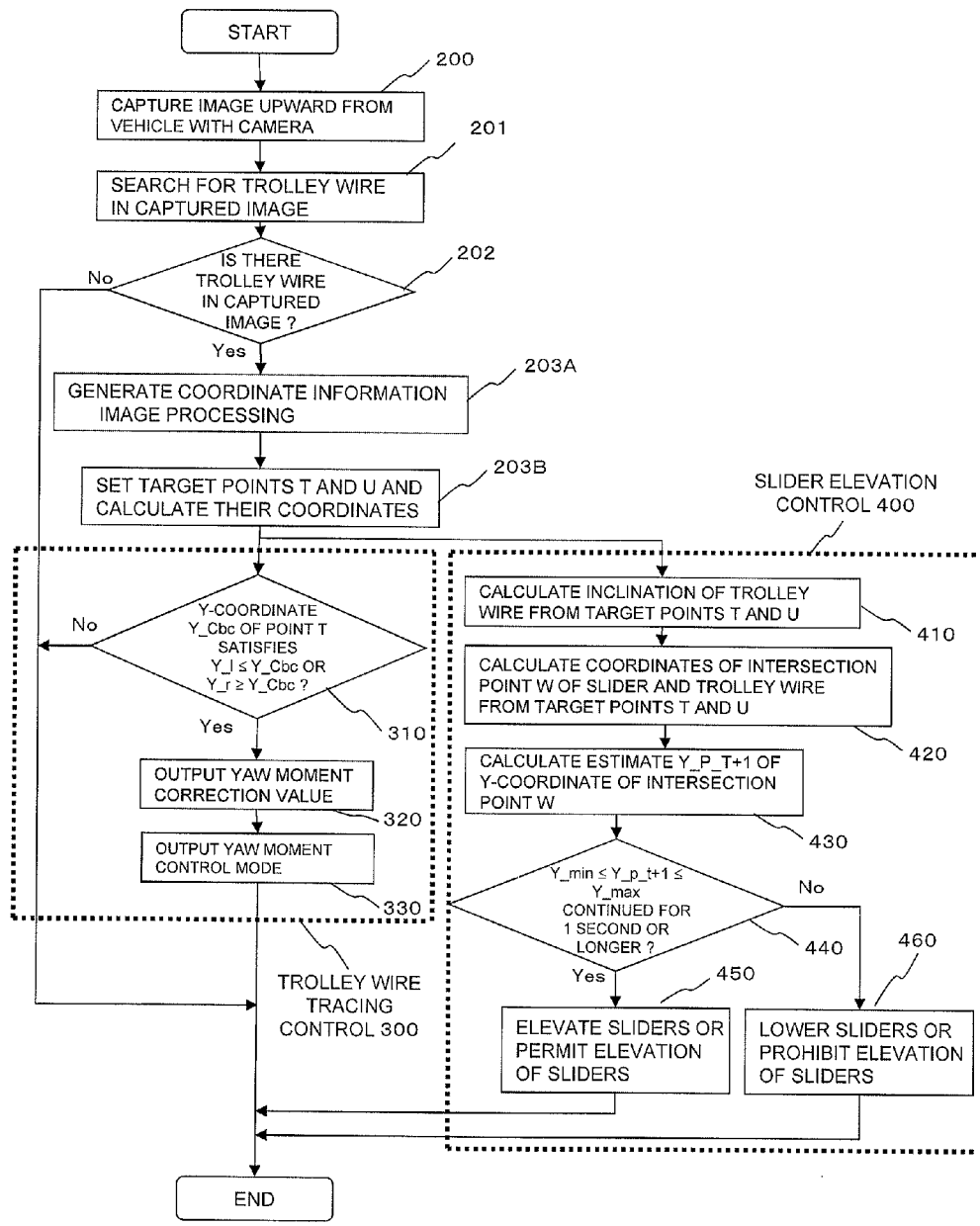
FIG. 21 is a flow chart showing a process flow from upward shooting with the camera to control output in accordance with an embodiment of the present invention.
Figure 22:
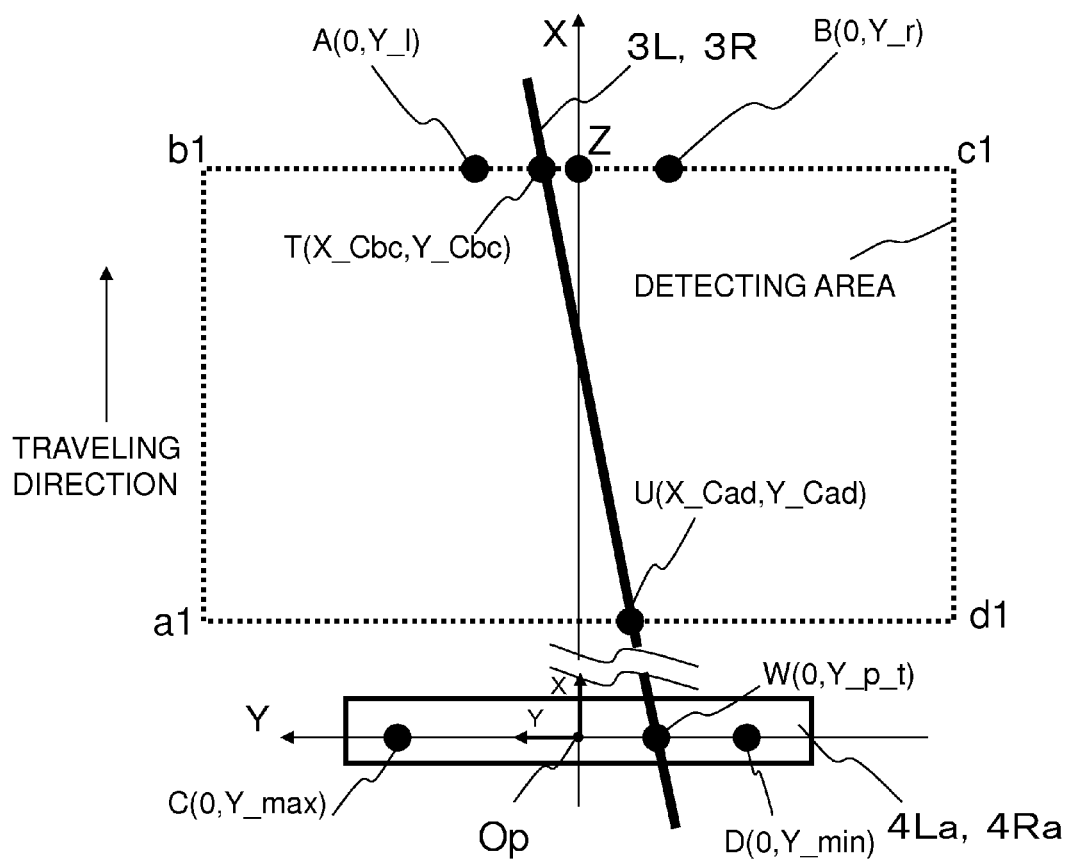
FIG. 22 is a schematic diagram similar to FIG. 19, viewing the positional relationship between the trolley wires and sliders from above and indicating a first threshold value.

The details of the control process executed by the vehicle control device 50, including the aforementioned elevation control of the sliders 4Ra and 4La, will be explained below referring to a flow chart of FIG. 21. FIG. 21 is a flow chart showing the flow of the process from the upward shooting with the camera to the control output. It is assumed as shown in FIG. 12 that a camera is set in front of the vehicle 1 to be on the extension line of the vehicle axis and the number of trolley wires shot with the camera is one. FIG. 22 is a schematic diagram similar to FIG. 19, wherein a dead zone of the trolley wire tracing control has been set. The target points T and U and the representative point Z have been set for the detecting area a1, b1, c1, d1 as explained above. Further, points A and B specifying the dead zone of the trolley wire tracing control have been set at positions a prescribed distance (first threshold value) apart (Y_l, Y_r) from the representative point Z.

In the first step 200, the image information processing unit 50a captures an image upward from the vehicle 1 with the camera. In step 201, the image information processing unit 50a searches the captured image for the trolley wire 3R/3L. In the search in the step 201, the whole area of the captured image is searched when the detection of the trolley wire 3R/3L is carried out for the first time. After the trolley wire 3R/3L has been detected once, searching the whole area is unnecessary; searching only a limited area in the vicinity of the coordinates of the already detected trolley wire 3R/3L is effective since it leads to reduction of the search time. In step 202, the image information processing unit 50a judges whether or not there exists an object corresponding to the trolley wire 3R/3L in the captured image. If no object corresponding to the trolley wire 3R/3L is found, the process is finished. If there exists an object corresponding to the trolley wire 3R/3L, the process advances to step 203A. In the step 203A, the image information processing unit 50a executes the edge extraction and the image processing for calculating the center line of the trolley wire 3R/3L.

Thereafter, the process is handed over to the vehicle state quantity calculation unit 50b. In step 203B, the vehicle state quantity calculation unit 50b sets the aforementioned target points T and U and calculates the coordinates of the target points T and U. At this point, the process using the coordinate information on the target points T and U separates into two flows: a tracing control step 300 for tracing the trolley wire 3R/3L and an elevation control step 400 for controlling the elevation of the slider 4Ra/4La.

<Trolley Wire Tracing Control>

First, the trolley wire tracing control step 300 will be explained below.

In step 310, the vehicle state quantity calculation unit 50b judges whether or not the target point T exists between the points A and B (Y_l≤Y_Cbc, Y_r≥Y_Cbc) which have been set at positions a prescribed distance apart (Y_l, Y_r) from the representative point Z shown in FIG. 22. When the target point T does not exist between the points A and B, the process advances to step 320 and the vehicle state quantity control unit 50c calculates and outputs the yaw moment correction value.

Figure 23:
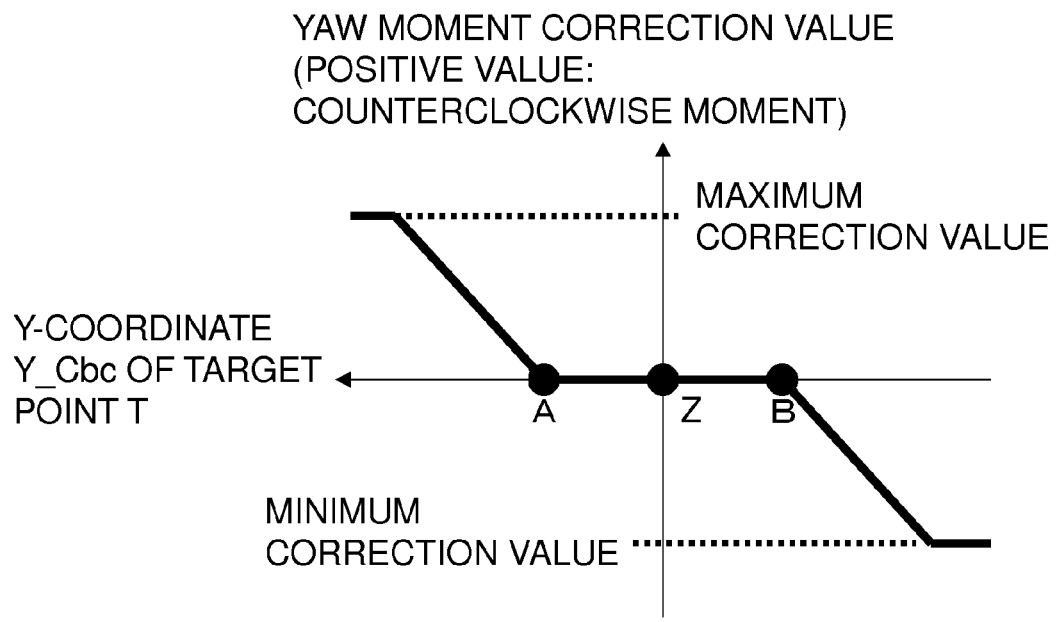
FIG. 23 is a schematic diagram showing an example of a method for calculating the yaw moment correction value corresponding to the position of the target point.

FIG. 23 is a schematic diagram showing an example of a method for calculating the yaw moment correction value employed in this case. As mentioned above, the Y-coordinate value Y_Cbc of the target point T in front of the slider 4Ra/4La equals the deviation between the representative point Z and the target point T. In FIG. 23, the gradient of the characteristic lines outside the points A and B corresponds to the gain of the conversion unit 50$c_2$ shown in FIG. 20.

As shown in FIGS. 23 and 20, a yaw moment correction value corresponding to the Y-coordinate value Y_Cbc of the target point T (corresponding to the deviation between the representative point Z and the target point T) is calculated outside the points A and B. Specifically, in the range outside the point A (where Y_Cbc is positive), the yaw moment correction value is increased with the increase in Y_Cbc. In the range outside the point B (where Y_Cbc is negative), the yaw moment correction value is decreased with the decrease in Y_Cbc. According to this calculation, when the target point T does not exist between the points A and B (i.e., when the absolute value of the deviation Y_Cbc between the representative point Z and the target point T is greater than the absolute value of the Y-coordinate value Y_l of the point A or the Y-coordinate value Y_r of the point B as the first threshold value), control is executed to give an appropriate yaw moment to the vehicle 1 so as to make the representative point Z approach the target point T. Further, the control is executed so that the yaw moment given to the vehicle 1 increases with the increase in the absolute value of the deviation Y_Cbc. After the yaw moment correction value has reached a maximum correction value or a minimum correction value, the yaw moment correction value is set constant in order to prevent abrupt/extreme turning of the vehicle. Incidentally, it is also possible to output a constant yaw moment correction value in such cases where the target point T does not exist between the points A and B, instead of calculating and outputting the yaw moment correction value as a variable.

Here, the reason for setting the yaw moment correction value at 0 between the points A and B shown in FIG. 23 will be explained. By the control for making the representative point z coincide with the target point T, the point W is positioned almost at the center of the slider 4Ra/4La as long as the vehicle 1 is traveling forward. In this case, however, the yaw moment correction value is calculated even when the point W has slightly shifted from the center of the slider 4Ra/4La and that increases the frequency of operation of the actuators implementing the yaw moment correction (the reaction force motor 42 and the steerage motor 43 of the steering device 40 (FIG. 5) and the rear wheel electric motors 6R and 6L (FIG. 3) in this embodiment). By setting the yaw moment correction value at 0 between the points A and B, the frequency of operation of the rear wheel electric motors 6R and 6L can be reduced and high control stability and riding comfort can be secured. The width of the range between the points A and B (in which the yaw moment correction is unnecessary) may be set depending on the width of the slider 4Ra/4La.

Further, by executing the control so as to increase the yaw moment given to the vehicle 1 with the increase in the absolute value of the deviation Y_Cbc, the vehicle 1 is given the yaw moment so that trolley wires 3R and 3L quickly returns to the center of the sliders 4Ra and 4La when the slider 4Ra/4La of the traveling vehicle is about to widely deviate from the trolley wire 3R/3L in the lateral direction. Consequently, the dump truck can securely be prevented from deviating from the lane with the trolley wires 3R and 3L.

In the next step 330, the yaw moment control mode is selected and outputted. In normal traveling, the mode "1" is selected as the yaw moment control mode since there is no request for reducing the vehicle speed (driver's retarder operation or deceleration by other control).

<Another Example of Trolley Wire Tracing Control>

Figure 24:
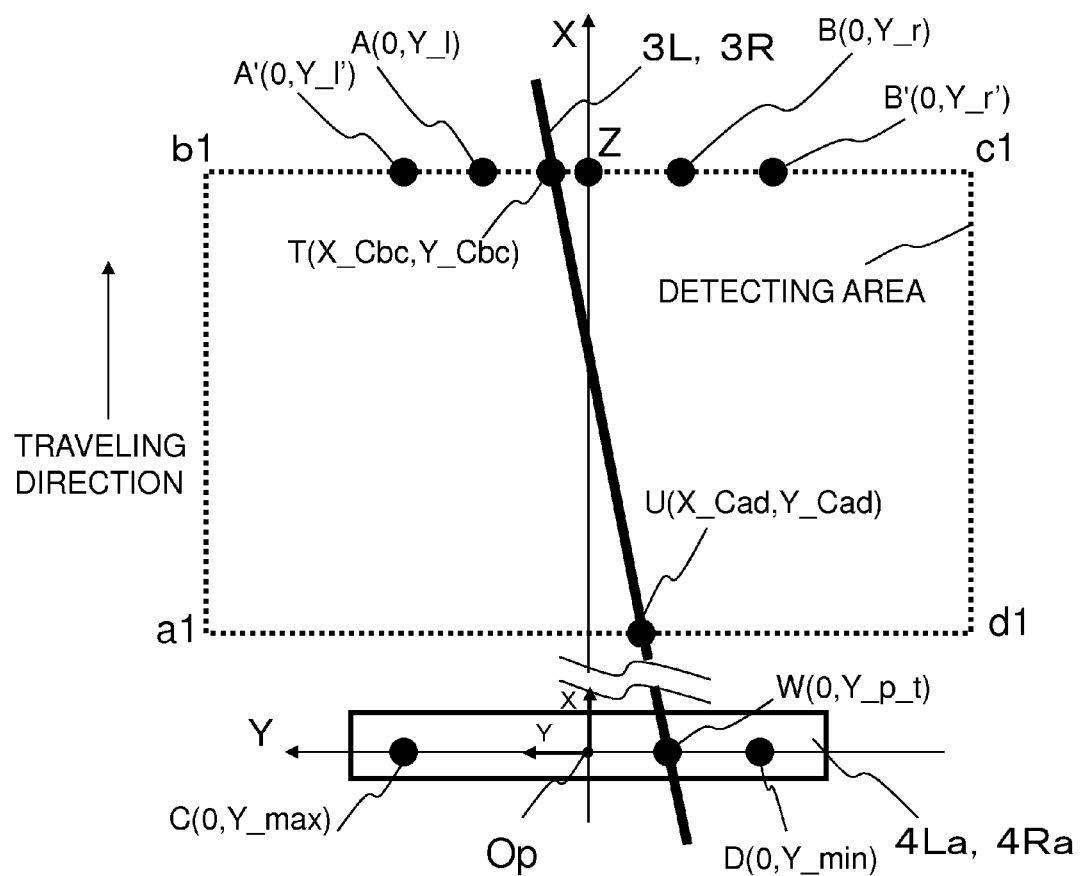
FIG. 24 is a schematic diagram similar to FIGS. 19 and 22, viewing the positional relationship between the trolley wires and sliders from above and showing an image in which first and second threshold values are set.
Figure 25:
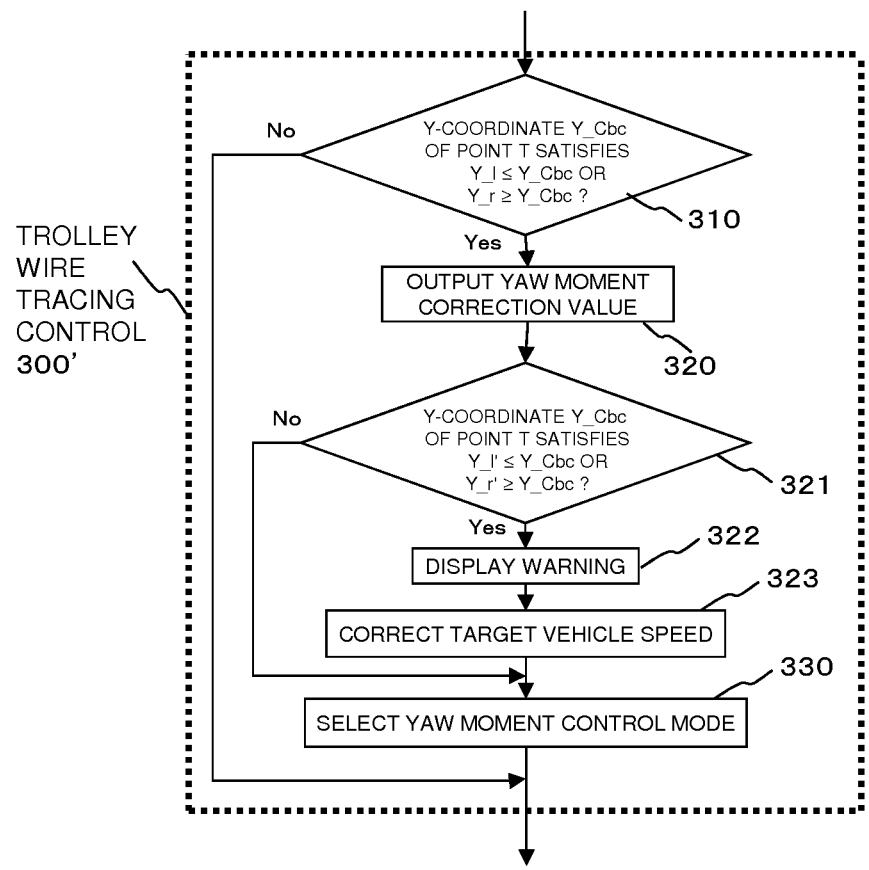
FIG. 25 is a flow chart showing another example of a trolley wire tracing control step in the flow chart of FIG. 21.

Next, another example of the trolley wire tracing control will be explained below referring to FIGS. 24-27. FIG. 24 is a schematic diagram similar to FIGS. 19 and 22, wherein deviation monitoring points for the trolley wire tracing control have been set. FIG. 25 is a flow chart showing step 300' which is executed instead of the trolley wire tracing control step 300 in the flow chart of FIG. 21.

As shown in FIG. 24, a point A' (second threshold value) at a position outside (with a larger Y-coordinate value than) the point A and with a Y-coordinate value Y_l' and a point B' (second threshold value) at a position outside (with a smaller negative Y-coordinate value than) the point B and with a Y-coordinate value Y_r' have been set as the deviation monitoring points for the trolley wire tracing control.

In FIG. 25, the process till the step 320 for calculating the yaw moment correction value is identical with that in FIG. 21 explained above. In step 321 after the step 320, whether the target point T is situated between the points A' and B' (Y_l'≤Y_Cbc, Y_r'≥Y_Cbc) or not is judged (step 321). If affirmative, a warning for urging the driver to correct the steering is issued by sound and/or display (step 322) since there is a possibility that the vehicle deviates from the trolley lane.

Figure 26:
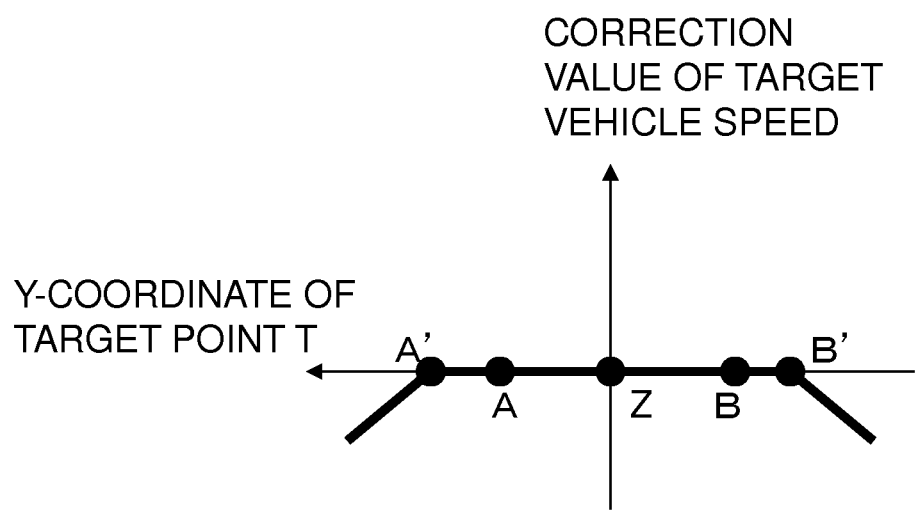
FIG. 26 is a schematic diagram showing an example of a method for calculating a target vehicle speed correction value (for correcting the target vehicle speed to the decreasing side) depending on the position of the target point.

In the next step 323, the target vehicle speed is corrected depending on the position of the target point T. FIG. 26 is a schematic diagram showing an example of a method for calculating a target vehicle speed correction value in this case. As shown in FIG. 26, when the target point T does not exist between the points A' and B', the target vehicle speed correction value is calculated so as to reduce the target vehicle speed depending on the degree of deviation from the points A' and B'. Specifically, in the range outside the point A' (where Y_Cbc is positive), the correction value on the side of decreasing the target vehicle speed is increased with the increase in Y_Cbc. In the range outside the point B' (where Y_Cbc is negative), the correction value on the side of decreasing the target vehicle speed is decreased with the decrease in Y_Cbc. According to this calculation, when the target point T does not exist between the points A' and B' (i.e., when the absolute value of the deviation Y_Cbc between the representative point Z and the target point T is greater than the absolute value of the Y-coordinate value Y_l' of the point A' or the Y-coordinate value Y_r' of the point B' as the second threshold value), control is executed to decrease the traveling speed with the increase in the absolute value of the deviation Y_Cbc. Decreasing the vehicle speed as above is effective for lightening the operating load on the driver and giving a feeling of security to the driver.

Figure 27:
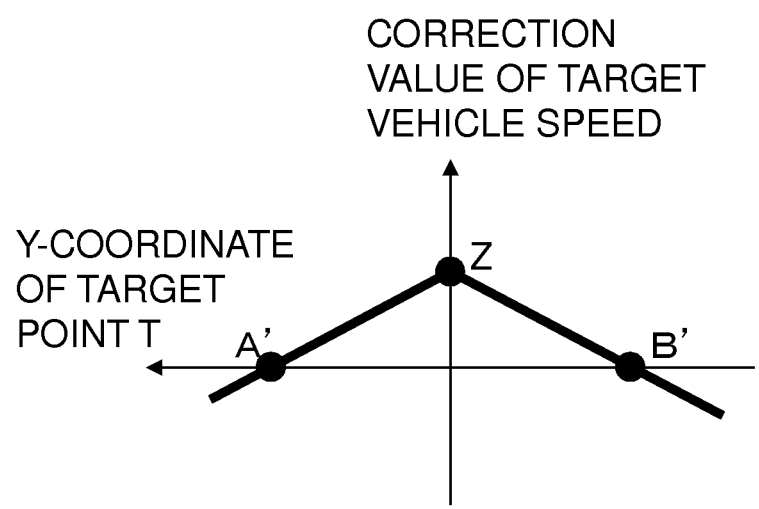
FIG. 27 is a schematic diagram showing an example of a method for calculating the target vehicle speed correction value (for correcting the target vehicle speed to the increasing side) depending on the position of the target point.

FIG. 27 is a schematic diagram showing another example of the method for calculating the target vehicle speed correction value. As shown in FIG. 27, when the target point T exists between the points A' and B', the correction may be made to increase the target vehicle speed as target point T approaches the representative point Z. Specifically, in the range inside the point A' (where Y_Cbc is positive), the correction value on the side of increasing the target vehicle speed is increased with the decrease in Y_Cbc. In the range inside the point B' (where Y_Cbc is negative), the correction value on the side of increasing the target vehicle speed is decreased with the increase in Y_Cbc. According to this calculation, when the target point T exists between the points A' and B' (i.e., when the absolute value of the deviation Y_Cbc between the representative point Z and the target point T is less than the absolute value of the Y-coordinate value Y_l' of the point A' or the Y-coordinate value Y_r' of the point B' as the second threshold value), control is executed to increase the traveling speed with the decrease in the absolute value of the deviation Y_Cbc. Increasing the vehicle speed as above is effective for increasing the working efficiency.

Figure 28:
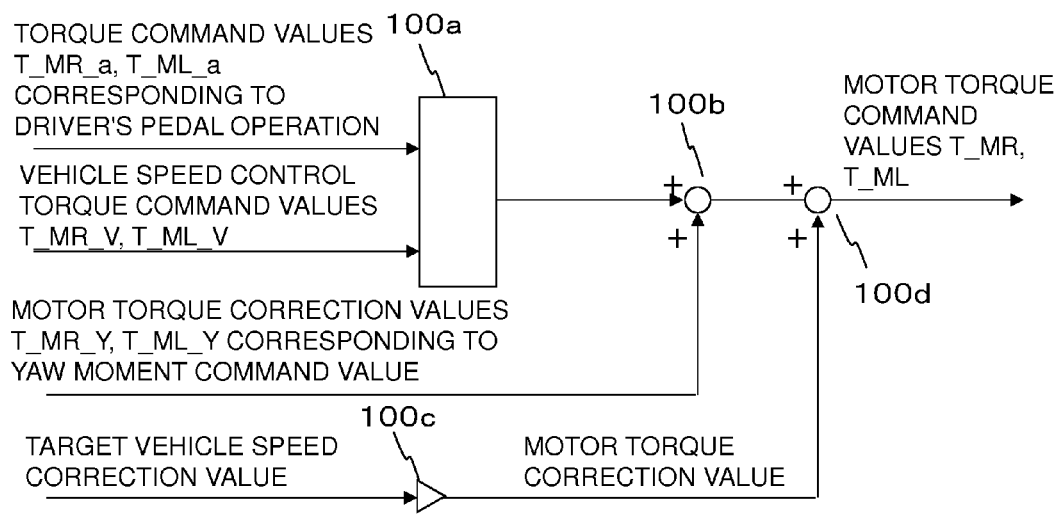
FIG. 28 is a schematic diagram similar to FIG. 10, showing a method for generating motor torque according to the target vehicle speed correction value.

FIG. 28 is a schematic diagram similar to FIG. 10, showing a method for generating motor torque according to the target vehicle speed correction value. As shown in FIG. 28, the target vehicle speed correction value calculated as above is converted into a motor torque correction value by a conversion unit 100c by multiplying the target vehicle speed correction value by a gain factor. Subsequently, the motor torque command values T_MR and T_ML are calculated by a calculation unit 100d by adding the motor torque correction value (corresponding to the target vehicle speed correction value) calculated by the conversion unit 100c to the motor torque command values calculated by the calculation unit 100b (acquired by adding the motor torque correction values T_MR_Y and T_ML_Y corresponding to the yaw moment command value generated by the yaw moment control unit 102 (FIG. 8) to the torque command values selected by the processing unit 100a).

Next, the yaw moment control mode in the case where the target vehicle speed is corrected to a lower value according to the target vehicle speed correction value shown in FIG. 26 will be explained. As shown in FIG. 9, in cases where a yaw moment has to be generated when the right and left motors are outputting 100% motor torque, it is necessary to reduce the motor torque of one of the right and left motors. The reduction of the motor torque of one of the motors leads to a drop in the vehicle speed since the vehicle cannot maintain the present speed with the reduced motor torque. Thus, in cases where the target vehicle speed is corrected to a lower value, the yaw moment correction may be made not by the steerage torque correction but by the correction of the motor torque, by which both the control of giving a yaw moment to the vehicle 1 by controlling the right and left electric motors 6R and 6L and the control of the traveling speed are carried out. Consequently, efficient control, achieving both the deceleration and the generation of the yaw moment at the same time, can be carried out.

<Slider Elevation Control>

Next, the slider elevation control step 400 will be explained below.

As shown in FIGS. 19, 22 and 24, the points C and D are set to specify the permissible range of the Y-coordinate Y_p_t of the point W on the slider 4Ra/4La within which the slider 4Ra/4La is in contact with the trolley wire 3R/3L and satisfactory electric power can be acquired continuously.

In step 410 in FIG. 21, the inclination of the trolley wire 3R/3L is calculated from the target points T and U according to the expression (1). From the inclination and the coordinates of the target point T, the coordinates of the intersection point W of the slider 4Ra/4La and the trolley wire 3R/3L is calculated in step 420. This calculation is performed according to the aforementioned expression (2). In the next step 430, the estimate Y_p_t+1 of the Y-coordinate of the intersection point W in the next step is calculated. In step 440, duration of a state in which the estimate Y_p_t+1 stays in the prescribed range between the points C and D (Y_min≤Y_p_t+1≤Y_max) is measured by use of a counter and whether or not the duration of the state was a prescribed period (e.g., 1 second) or longer is judged. If the duration of the state (with the point W existing between the points C and D) was 1 second or longer in the step 440, the process advances to step 450 and the elevation of the sliders 4Ra and 4La is permitted. In this case, it is possible, for example, to inform the driver of the permission of the elevation of the sliders 4Ra and 4La by sound and/or display. In response to a switching operation by the driver, the vehicle control device 50 outputs a command signal for the elevation control and the elevation control device 31 controls the elevation of the sliders 4Ra and 4La according to the command signal. When the sliders 4Ra and 4La have been lowered, it is also possible to automatically elevate the sliders 4Ra and 4La, for example, instead of entrusting the elevating operation to the driver. The vehicle control device 50 outputs the command signal for the elevation control and the elevation control device 31 controls the elevation of the sliders 4Ra and 4La according to the command signal. In this case, it is possible to inform the driver of the automatic elevation of the sliders 4Ra and 4La by sound and/or display, for example.

In contrast, if the duration of the state (with the point W existing in the prescribed range) was less than 1 second in the step 440, the process advances to step 460 to instruct the driver by sound and/or display to lower the sliders 4Ra and 4La if the sliders have been elevated. The sliders 4Ra and 4La may also be lowered automatically. In this case, it is desirable to inform the driver of the automatic lowering of the sliders 4Ra and 4La by sound and/or display, for example. If the sliders 4Ra and 4La have already been lowered, the elevation of the sliders 4Ra and 4La is prohibited. In this case, it is desirable to inform the driver of the prohibition of the elevation of the sliders 4Ra and 4La by sound and/or display. Also in these cases, the vehicle control device 50 outputs a command signal automatically or in response to the driver's switching operation and the elevation control device 31 controls the lowering of the sliders 4Ra and 4La according to the command signal. This lightens the load on the operator (driver) for elevating and lowering the sliders 4Ra and 4La after the dump truck has entered the trolley traveling section.

While the judgment on whether or not the state (in which the estimate Y_p_t+1 stays between the points C and D (Y_min≤Y_p_t+1≤Y_max) continued for a prescribed period (e.g., 1 second) or longer is made in the step 440 in FIG. 21, it is also possible to immediately advance to the step 460 (without making such a judgment) when the estimate Y_p_t+1 exists between the points C and D (Y_min≤Y_p_t+1≤Y_max) and immediately advance to the step 450 when the estimate Y_p_t+1 does not exist between the points C and D (Y_min≤Y_p_t+1≤Y_max). However, the step 440 is effective for the purpose of preventing the hunting of judgment caused by repeated deviation/reentrance from/to the prescribed range when the Y-coordinate Y_p_t of the point W is unstable due to undulation of the road surface and noise occurring in the image processing.

Figure 29:
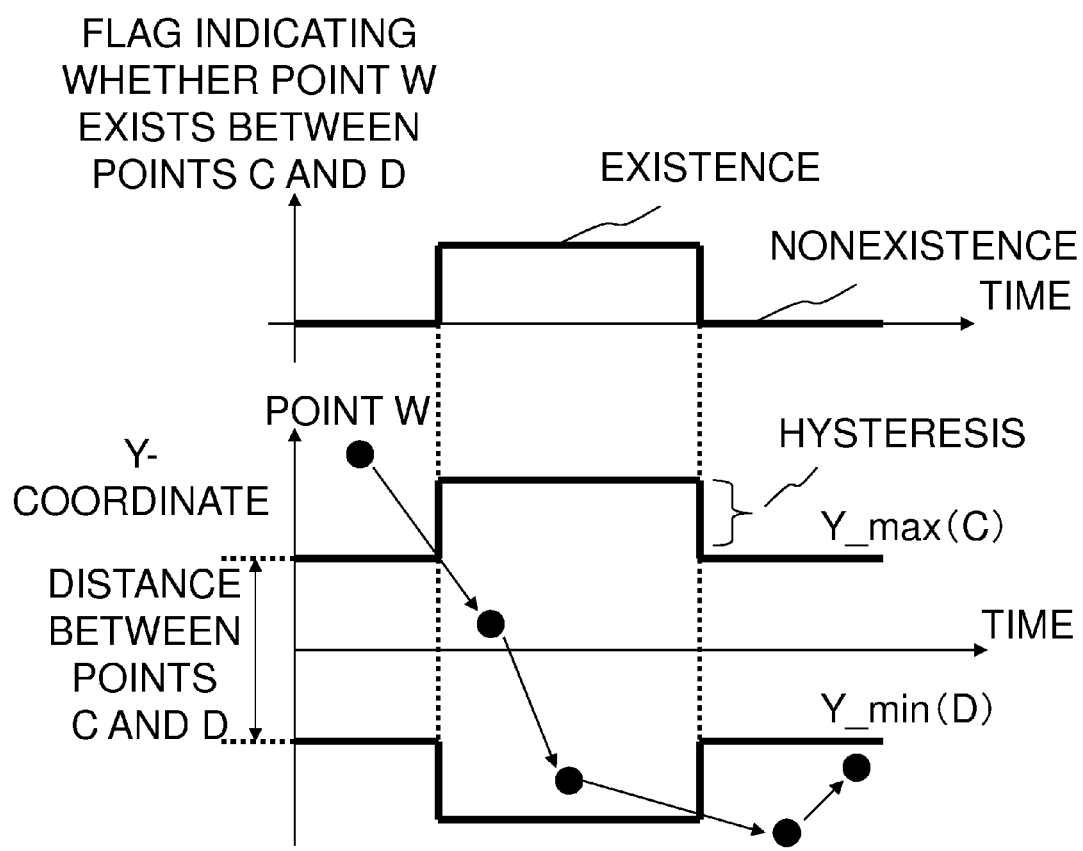
FIG. 29 is a schematic diagram showing a hysteresis process which can be executed instead of a counter process for preventing hunting of judgment.

FIG. 29 is a schematic diagram showing a hysteresis process which can be executed instead of the step 440 employing the counter. As shown in FIG. 29, when the point W exists between the points C and D, the setting of the points C and D is changed to increase the distance between the points C and D. In contrast, when the point W does not exist between the points C and D, the setting of the points C and D is changed to decrease the distance between the points C and D. Also by giving hysteresis to the distance between the points C and D as above, effect similar to that of the counter process (step 440) can be achieved.

<Effect>

According to this embodiment configured as above, the following effects are achieved: Since the trolley wires 3R and 3L are detected from below in this embodiment, there are less factors leading to detection errors compared to the conventional technique detecting lane markers, etc. by capturing images of the ground surface. As a result, the accuracy of the trolley wire detection is improved. By controlling the elevation of the sliders 4Ra and 4La of the power collectors 4R and 4L based on the information detected as above, countermeasures (prohibiting the elevating operation of the sliders 4Ra and 4La, lowering the sliders 4Ra and 4La when the sliders have been elevated, etc.) can be taken even when the central position of a slider 4Ra/4La of the traveling vehicle has deviated widely from the trolley wire 3R/3L in the lateral direction. Consequently, the operating load on the driver during the trolley traveling can be lightened considerably.

Further, thanks to the improvement of the trolley wire detection accuracy, the control accuracy of the yaw moment control for making the vehicle travel while tracing the trolley wires 3R and 3L is improved. Consequently, the central position of each slider 4Ra/4La of the traveling vehicle hardly deviates widely from the trolley wire 3R/3L in the lateral direction. Also from this viewpoint, the operating load on the driver in the trolley traveling section can be lightened considerably.

In the case where a camera 15 is used as the trolley wire detecting device, illuminating the trolley wires 3R and 3L with the illuminating device 51 is effective for maintaining high contrast between the sky and the trolley wires 3R and 3L. By use of the illuminating device 51, the yaw moment control for making the vehicle travel while tracing the trolley wires 3R and 3L can be executed with high accuracy not only in the daytime with fine weather but also in conditions in which such high contrast between the sky and the trolley wires 3R and 3L is hardly achieved (evening, nighttime, rainy weather, etc.).

Furthermore, the control device 200 is capable of executing the yaw moment control by using the vehicle control device 50 and the controller 100 as separate components. With this configuration, even when the controller 100 is an already-existing controller, the yaw moment control in accordance with the present invention can be carried out by just adding the vehicle control device 50 to the controller. The parameters of the yaw moment control can be adjusted just by changing the functions of the vehicle control device 50. Consequently, high flexibility can be given to the control system.

OTHER EXAMPLES

Figure 30:
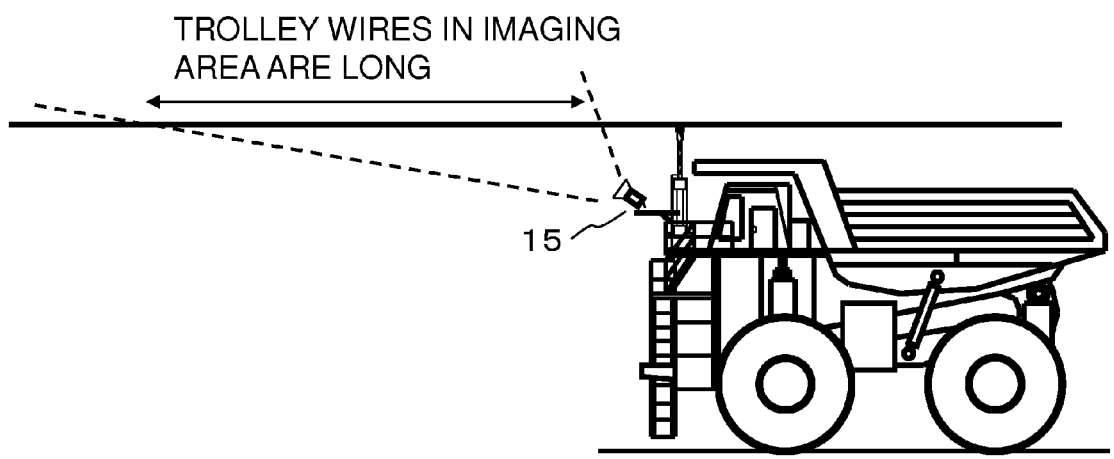
FIG. 30 is a schematic diagram similar to FIG. 12, showing an example in which the shooting direction of the camera is shifted forward.

While the camera used as the trolley wire detecting device was pointed directly upward in the above embodiment, the camera may also be set to capture images in a forward and upward direction from the vehicle as shown in FIG. 30. Such camera setting facilitates the detection/recognition of the trolley wires as the target of the tracing since the parts of the trolley wires shot with the camera in the vehicle's traveling direction are long. On the other hand, noise caused by the scenery included in the imaging area increases as the imaging area is shifted forward. Therefore, the imaging area of the camera may be adjusted properly depending on the environment in which the present invention is employed.

DESCRIPTION OF REFERENCE NUMERALS 1 vehicle
2 vessel
3L, 3R trolley wire
4L, 4R power collector
4La, 4Ra slider 4a hydraulic piston device
4b hydraulic piston
4c rod
4d hydraulic line
4e hydraulic device
4f insulator
4g electric wire
4h elevation command signal
5L, 5R rear wheel
6L, 6R electric motor
6La, 6Ra output shaft
7L, 7R decelerator
11 accelerator pedal
12 retarder pedal
13 shift lever
14 combined sensor
15 camera
16L, 16R electromagnetic pickup sensor
21 engine
21a electronic governor
22 AC generator
23 rectifier circuit
24 sensing resistor
25 capacitor
26 chopper circuit
27 grid resistor
28 other engine load
30 inverter control device
30a torque command calculation unit
30b motor control calculation unit
30c inverter (switching element)
31 elevation control device
32 steering control device
32a conversion unit
32b calculation unit
32c conversion unit
32d calculation unit
40 steering device
41 steering wheel
42 reaction force motor having a steering angle sensor
43 steerage motor having a steerage angle sensor
44 rack-and-pinion gear
45L, 45R front wheel
50 vehicle control device
50a image information processing unit
50b vehicle state quantity calculation unit
50c vehicle state quantity control unit
$50c_1$ calculation unit
$50c_2$ conversion unit
$50c_3$ conversion unit
51 illuminating device
52 insulator
53 support
100 controller
100a processing unit
100b calculation unit
101 vehicle speed control unit
101a calculation unit
101b conversion unit
101c switch unit
101d zero output unit
102 yaw moment control unit
102a calculation unit
102b steering torque control unit
102c motor torque control unit
102d optimum distribution control unit
102e switch unit
200 control device
P, Q, R, S target point
P', Q', R', S' representative point
T target point
Z representative point (control point)
$\theta\_L$ inclination
Y_Cbc deviation
$\theta\_t$ inclination
Y_I, Y_r Y-coordinate value of point A, B (first threshold value)
Y_I', Y_r' Y-coordinate value of point A', B' (second threshold value)

The invention claimed is:

1. An electrically driven dump truck which elevates a slider of a power collector provided on a vehicle to be movable up and down, places the slider in contact with a trolley wire installed along a lane, and travels by using electric power from the trolley wire, comprising:
a trolley wire detecting device which is provided on the vehicle and detects the trolley wire in an imaging area existing ahead of the vehicle in which the slider does not exist from below when the dump truck is traveling; and
a control device which sets a target point which is an intersection part of a detecting area of the trolley wire detecting device and the trolley wire in the imaging area, calculates an intersection point with the slider and the trolley wire from the target point, judges whether the intersection point is in a prescribed range or not, and controls the elevation of the slider of the power collector based on the judging result.

2. The electrically driven dump truck according to claim 1, wherein:
when the intersection point has deviated from the prescribed range, the control device executes control to prohibit an operation for elevating the slider or to lower the slider when the slider has been elevated.

3. The electrically driven dump truck according to claim 2, wherein the control device calculates at least one representative point of the vehicle based on information detected by the trolley wire detecting device, calculates a deviation between the representative point and the target point, and issues a warning that the vehicle is apt to deviate from the lane when the absolute value of the deviation is greater than a threshold value.

4. The electrically driven dump truck according to claim 3, wherein the trolley wire detecting device includes:
a camera which is provided on the vehicle and continuously captures images of the trolley wire when the dump truck is traveling; and
an illuminating device which is provided on the vehicle and illuminates the trolley wire.

5. The electrically driven dump truck according to claim 2, wherein the trolley wire detecting device includes:
a camera which is provided on the vehicle and continuously captures images of the trolley wire when the dump truck is traveling; and
an illuminating device which is provided on the vehicle and illuminates the trolley wire.

6. The electrically driven dump truck according to claim 1, wherein:
when the intersection point is within the prescribed range, the control device executes control to permit an operation for elevating the slider or to elevate the slider when the slider has been lowered.

7. The electrically driven dump truck according to claim 6, wherein the control device calculates at least one representative point of the vehicle based on information detected by the trolley wire detecting device, calculates a deviation between the representative point and the target point, and issues a warning that the vehicle is apt to deviate from the lane when the absolute value of the deviation is greater than a threshold value.

8. The electrically driven dump truck according to claim 7, wherein the trolley wire detecting device includes:
   a camera which is provided on the vehicle and continuously captures images of the trolley wire when the dump truck is traveling; and
   an illuminating device which is provided on the vehicle and illuminates the trolley wire.

9. The electrically driven dump truck according to claim 6, wherein the trolley wire detecting device includes:
   a camera which is provided on the vehicle and continuously captures images of the trolley wire when the dump truck is traveling; and
   an illuminating device which is provided on the vehicle and illuminates the trolley wire.

10. The electrically driven dump truck according to claim 1, wherein the control device calculates at least one representative point of the vehicle based on information detected by the trolley wire detecting device, calculates a deviation between the representative point and the target point, and issues a warning that the vehicle is apt to deviate from the lane when the absolute value of the deviation is greater than a threshold value.

11. The electrically driven dump truck according to claim 10, wherein the trolley wire detecting device includes:
   a camera which is provided on the vehicle and continuously captures images of the trolley wire when the dump truck is traveling; and
   an illuminating device which is provided on the vehicle and illuminates the trolley wire.

12. The electrically driven dump truck according to claim 1, wherein the trolley wire detecting device includes:
   a camera which is provided on the vehicle and continuously captures images of the trolley wire when the dump truck is traveling; and
   an illuminating device which is provided on the vehicle and illuminates the trolley wire.

\* \* \* \* \*